(12) United States Patent
Tsang et al.

(10) Patent No.: US 12,073,205 B2
(45) Date of Patent: Aug. 27, 2024

(54) INDEPENDENTLY UPGRADEABLE DOCKING STATIONS

(71) Applicant: Targus International LLC, Anaheim, CA (US)

(72) Inventors: Man Cheung Dan Tsang, Anaheim, CA (US); Chi Hang Leung, Hong Kong (CN); Ronald DeCamp, Anaheim, CA (US)

(73) Assignee: Targus International LLC, Anaheim, CA (US)

( * ) Notice: Subject to any disclaimer, the term of this patent is extended or adjusted under 35 U.S.C. 154(b) by 0 days.

(21) Appl. No.: 17/447,669

(22) Filed: Sep. 14, 2021

(65) Prior Publication Data
US 2023/0077706 A1 Mar. 16, 2023

(51) Int. Cl.
G06F 8/654 (2018.01)
G06F 1/16 (2006.01)
G06F 13/42 (2006.01)
H04L 9/32 (2006.01)

(52) U.S. Cl.
CPC .......... *G06F 8/654* (2018.02); *G06F 13/4282* (2013.01); *H04L 9/3247* (2013.01); *G06F 1/1632* (2013.01); *G06F 2213/0042* (2013.01)

(58) Field of Classification Search
None
See application file for complete search history.

(56) References Cited

U.S. PATENT DOCUMENTS

| 5,539,616 A | 7/1996 | Kikinis |
| 5,619,397 A | 4/1997 | Honda et al. |
| 5,627,974 A | 5/1997 | Watts, Jr. et al. |

(Continued)

FOREIGN PATENT DOCUMENTS

| AU | 2014100171 A4 | 3/2014 |
| CN | 101893916 A | 11/2010 |

(Continued)

OTHER PUBLICATIONS

U.S. Appl. No. 17/229,547, Non-Final Office Action, Feb. 15, 2022, 24 pages.

(Continued)

*Primary Examiner* — Henry Tsai
*Assistant Examiner* — Christopher A Bartels
(74) *Attorney, Agent, or Firm* — Stoel Rives LLP

(57) ABSTRACT

Systems and methods for independently upgradeable docking stations are discussed herein. One or more chipsets of a docking station may provide services to a host device, and each may use a corresponding firmware. The docking station may receive chipset firmware update data for one or more of the chipsets. In a first case, this data is received from a universal serial bus (USB) storage device (which in some cases can independently update its copy of the chipset firmware update data with a cloud server). In other cases, this data is received from a cloud server using a network interface system on a chip (which may be internal to, or separately connected to, the docking station). The docking station performs this receipt and/or the corresponding firmware update with no input from any host device that may (or may not) be attached, and/or without interrupting chipset services of any such host device.

26 Claims, 6 Drawing Sheets

(56) References Cited

U.S. PATENT DOCUMENTS

| | | |
|---|---|---|
| 5,692,400 A | 12/1997 | Bliven et al. |
| 5,751,548 A | 5/1998 | Hall et al. |
| 5,835,733 A | 11/1998 | Walsh et al. |
| 5,864,708 A | 1/1999 | Croft et al. |
| 5,873,151 A | 2/1999 | Sood |
| 5,886,424 A | 3/1999 | Kim |
| 6,029,215 A | 2/2000 | Watts, Jr. et al. |
| 6,170,026 B1 | 1/2001 | Kimura et al. |
| 6,275,378 B1 | 8/2001 | Lee et al. |
| 6,556,435 B1 | 4/2003 | Helot et al. |
| 6,558,201 B1 | 5/2003 | Begley et al. |
| 6,604,199 B1 | 8/2003 | Yang et al. |
| 6,629,182 B1 | 9/2003 | Mizoguchi et al. |
| 6,665,805 B1 | 12/2003 | Tsirkel et al. |
| 6,804,740 B1 | 10/2004 | Watts et al. |
| 6,888,338 B1 | 5/2005 | Popescu-Stanesti et al. |
| 6,956,474 B2 | 10/2005 | Jakubowski |
| 6,976,885 B2 | 12/2005 | Lord |
| 7,000,101 B2 | 2/2006 | Wu et al. |
| 7,035,100 B2 | 4/2006 | Charles |
| 7,035,126 B1 | 4/2006 | Lanni |
| 7,062,389 B2 | 6/2006 | Johnson et al. |
| 7,099,152 B2 | 8/2006 | Gasbarro |
| 7,103,760 B1 | 9/2006 | Billington et al. |
| 7,171,461 B2 | 1/2007 | Ewing et al. |
| 7,201,611 B2 | 4/2007 | Faranda |
| 7,225,227 B2 | 5/2007 | Omura et al. |
| 7,227,747 B2 | 6/2007 | Walker et al. |
| 7,281,698 B2 | 10/2007 | Patterson, Jr. |
| 7,315,444 B2 | 1/2008 | Chen et al. |
| 7,369,851 B2 | 5/2008 | Okkonen et al. |
| 7,403,232 B1 | 7/2008 | Orlicki et al. |
| 7,471,511 B2 | 12/2008 | Montag et al. |
| 7,532,461 B2 | 5/2009 | Krancher et al. |
| 7,542,759 B2 | 6/2009 | Edwards |
| 7,596,687 B2 | 9/2009 | Sultenfuss et al. |
| 7,643,283 B2 | 1/2010 | Jubelirer et al. |
| 7,681,134 B1 | 3/2010 | Grechishkin et al. |
| 7,683,573 B2 | 3/2010 | Nikazm et al. |
| 7,704,147 B2 | 4/2010 | Quraishi |
| 7,818,480 B2 | 10/2010 | Hoerl et al. |
| 7,857,664 B2 | 12/2010 | Waryck et al. |
| 7,899,970 B2 | 3/2011 | Mori |
| 7,926,430 B2 | 4/2011 | Bakker |
| 7,976,337 B1 | 7/2011 | Cortopassi et al. |
| 8,074,581 B2 | 12/2011 | Epstein et al. |
| 8,312,199 B2 | 11/2012 | Johnson |
| 8,323,040 B2 | 12/2012 | Prest |
| 8,346,753 B2 | 1/2013 | Hayes |
| 8,352,784 B2 | 1/2013 | Burg et al. |
| 8,352,934 B1 | 1/2013 | Borole et al. |
| 8,358,943 B2 | 1/2013 | Kim |
| 8,359,356 B2 | 1/2013 | Belz et al. |
| 8,395,605 B2 | 3/2013 | Sisto et al. |
| 8,498,618 B2 | 7/2013 | Ben |
| 8,508,573 B2 | 8/2013 | Grimshaw |
| 8,510,424 B2 | 8/2013 | Ewing et al. |
| 8,522,322 B2 | 8/2013 | Wishman et al. |
| 8,601,203 B2 | 12/2013 | Holbrook |
| 8,611,076 B2 | 12/2013 | Wetzel et al. |
| 8,751,836 B1 | 6/2014 | Piszczek et al. |
| 8,762,752 B2 | 6/2014 | Inbaraj et al. |
| 8,770,482 B2 | 7/2014 | Ackermann et al. |
| 8,774,071 B2 | 7/2014 | Meng |
| 8,793,680 B2 | 7/2014 | Jeong |
| 8,797,159 B2 | 8/2014 | Kirkpatrick et al. |
| 8,799,537 B1 | 8/2014 | Zhu et al. |
| 8,879,250 B2 | 11/2014 | Franz |
| 8,884,896 B2 | 11/2014 | Tabone et al. |
| 8,896,656 B2 | 11/2014 | Epstein et al. |
| 8,909,842 B2 | 12/2014 | Johnson |
| 8,913,380 B2 | 12/2014 | Enomoto et al. |
| 8,990,469 B2 | 3/2015 | Benhard et al. |
| 9,013,283 B1 | 4/2015 | Tackaberry |
| 9,033,228 B2 | 5/2015 | Govindarajan et al. |
| 9,092,632 B2 | 7/2015 | Wishman et al. |
| 9,128,796 B2 | 9/2015 | Chitre et al. |
| 9,152,177 B2 | 10/2015 | Feldstein |
| 9,189,751 B2 | 11/2015 | Matsuoka et al. |
| 9,197,728 B2 | 11/2015 | Pedersen et al. |
| 9,224,290 B1 | 12/2015 | Mason et al. |
| 9,249,927 B2 | 2/2016 | Graham |
| 9,274,994 B2 | 3/2016 | Capezza |
| 9,304,545 B2 | 4/2016 | Ramirez et al. |
| 9,325,595 B1 | 4/2016 | O'Donovan et al. |
| 9,338,268 B2 | 5/2016 | Holtman |
| 9,345,357 B1 | 5/2016 | Davila, Jr. |
| 9,362,777 B2 | 6/2016 | Lau et al. |
| 9,377,814 B2 | 6/2016 | Ramirez et al. |
| 9,392,427 B2 | 7/2016 | Goldman |
| 9,411,551 B2 | 8/2016 | Haren |
| 9,444,508 B2 | 9/2016 | Lee |
| 9,456,686 B2 | 10/2016 | Epstein |
| 9,531,651 B1 | 12/2016 | Cherubini |
| D782,562 S | 3/2017 | Gustaveson, II |
| 9,602,760 B2 | 3/2017 | Griffin et al. |
| 9,612,628 B2 | 4/2017 | Halim et al. |
| 9,634,903 B2 | 4/2017 | Yan et al. |
| 9,645,812 B2 | 5/2017 | Proschowsky |
| 9,647,481 B2 | 5/2017 | Huang et al. |
| 9,696,777 B2 | 7/2017 | Pamley et al. |
| 9,712,959 B2 | 7/2017 | Haoyang et al. |
| 9,723,358 B1 | 8/2017 | Chan |
| 9,736,427 B1 | 8/2017 | Grimshaw et al. |
| 9,760,116 B2 | 9/2017 | Wylie |
| 9,778,779 B2 | 10/2017 | Chartier et al. |
| 9,794,496 B2 | 10/2017 | Soffer et al. |
| 9,829,333 B1 | 11/2017 | Calder |
| 9,829,669 B1 | 11/2017 | Leipold |
| 9,836,969 B2 | 12/2017 | Thompson et al. |
| 9,838,475 B2 | 12/2017 | Brown et al. |
| 9,854,142 B2 | 12/2017 | Freeze |
| 9,961,306 B1 | 5/2018 | Lev et al. |
| 10,001,807 B2 | 6/2018 | Chung et al. |
| 10,013,019 B2 | 7/2018 | Juan et al. |
| 10,013,559 B2 | 7/2018 | Ali et al. |
| 10,070,021 B1 | 9/2018 | Rolle |
| 10,083,021 B2 | 9/2018 | Jamadagni et al. |
| 10,097,563 B2 | 10/2018 | Surdu et al. |
| 10,108,221 B1 | 10/2018 | Jin et al. |
| 10,203,964 B2 | 2/2019 | Johnnie et al. |
| 10,224,727 B2 | 3/2019 | Li et al. |
| 10,354,531 B1 | 7/2019 | Bronder et al. |
| 10,356,129 B2 | 7/2019 | Elias et al. |
| 10,409,751 B2 | 9/2019 | Grobelny |
| 10,452,096 B1 | 10/2019 | Keilers et al. |
| 10,462,611 B1 | 10/2019 | Klinkner et al. |
| 10,468,842 B2 * | 11/2019 | Sun .................. H01R 31/065 |
| 10,499,531 B2 | 12/2019 | Schmidt et al. |
| 10,578,657 B2 * | 3/2020 | Decamp .............. H04L 41/0833 |
| 10,623,701 B1 | 4/2020 | Bracewell et al. |
| 10,663,498 B2 | 5/2020 | Decamp et al. |
| 10,684,842 B2 | 6/2020 | Lin et al. |
| 10,705,852 B2 | 7/2020 | Vidyadhara et al. |
| 10,782,735 B2 | 9/2020 | Wylie |
| 10,789,061 B2 | 9/2020 | Dewan et al. |
| 10,802,818 B2 | 10/2020 | Kondapi et al. |
| 10,841,791 B1 | 11/2020 | Zhang et al. |
| 10,962,248 B1 | 3/2021 | Hasan et al. |
| 11,017,334 B2 | 5/2021 | Decamp et al. |
| 11,138,581 B2 | 10/2021 | Fernando et al. |
| 11,231,448 B2 * | 1/2022 | DeCamp .................. G01R 21/06 |
| 11,269,984 B2 * | 3/2022 | Raskin .................. H04L 9/3234 |
| 11,320,862 B2 | 5/2022 | Tang et al. |
| 11,360,534 B2 * | 6/2022 | Decamp .................. G06F 1/329 |
| 11,470,934 B2 | 10/2022 | Yuan |
| 2002/0080132 A1 | 6/2002 | Dai et al. |
| 2002/0095533 A1 | 7/2002 | Esterberg et al. |
| 2002/0119800 A1 | 8/2002 | Jaggers et al. |
| 2003/0084222 A1 | 5/2003 | Wurzburg |
| 2003/0107566 A1 | 6/2003 | Shin et al. |
| 2003/0114206 A1 | 6/2003 | Timothy et al. |
| 2003/0154293 A1 | 8/2003 | Zmolek et al. |
| 2003/0182150 A1 | 9/2003 | Reddy |

(56) References Cited

U.S. PATENT DOCUMENTS

| | | |
|---|---|---|
| 2003/0217098 A1 | 11/2003 | Bobde et al. |
| 2003/0217142 A1 | 11/2003 | Bobde et al. |
| 2003/0222149 A1 | 12/2003 | Solomon et al. |
| 2003/0222848 A1 | 12/2003 | Solomon et al. |
| 2004/0064621 A1 | 4/2004 | Dougherty et al. |
| 2004/0088465 A1 | 5/2004 | Bianchi |
| 2004/0095713 A1 | 5/2004 | Chuang |
| 2004/0111382 A1 | 6/2004 | Haji-Ioannou |
| 2004/0116149 A1 | 6/2004 | Yukie et al. |
| 2004/0125777 A1 | 7/2004 | Doyle et al. |
| 2004/0212586 A1 | 10/2004 | Denny |
| 2004/0268163 A1 | 12/2004 | Yeh |
| 2005/0033481 A1 | 2/2005 | Budhraja et al. |
| 2005/0036283 A1 | 2/2005 | Hillman et al. |
| 2005/0057893 A1 | 3/2005 | Homer et al. |
| 2005/0114503 A1 | 5/2005 | Ruetschi et al. |
| 2005/0162824 A1 | 7/2005 | Thompson |
| 2005/0164545 A1 | 7/2005 | Rosenthal et al. |
| 2005/0180086 A1 | 8/2005 | Schaefer et al. |
| 2005/0207110 A1 | 9/2005 | Wang et al. |
| 2005/0213298 A1 | 9/2005 | Doherty et al. |
| 2005/0245115 A1 | 11/2005 | Bell et al. |
| 2005/0246421 A1 | 11/2005 | Moore |
| 2006/0005055 A1 | 1/2006 | Potega |
| 2006/0031454 A1 | 2/2006 | Ewing et al. |
| 2006/0061958 A1 | 3/2006 | Solomon et al. |
| 2006/0061961 A1 | 3/2006 | Yin et al. |
| 2006/0075286 A1 | 4/2006 | Hodge et al. |
| 2006/0095641 A1 | 5/2006 | Pandit et al. |
| 2006/0103504 A1 | 5/2006 | Vassallo |
| 2006/0112375 A1 | 5/2006 | Schneider |
| 2006/0123807 A1 | 6/2006 | Sullivan et al. |
| 2006/0141830 A1 | 6/2006 | Diaz et al. |
| 2006/0161713 A1 | 7/2006 | Belady |
| 2006/0190652 A1 | 8/2006 | Keely et al. |
| 2006/0205381 A1 | 9/2006 | Beart et al. |
| 2006/0238497 A1 | 10/2006 | Velagapudi |
| 2006/0250764 A1 | 11/2006 | Howarth et al. |
| 2006/0250765 A1 | 11/2006 | Howarth et al. |
| 2006/0250767 A1 | 11/2006 | Brophy et al. |
| 2007/0030276 A1 | 2/2007 | Macinnis et al. |
| 2007/0033289 A1 | 2/2007 | Nuyttens et al. |
| 2007/0054550 A1 | 3/2007 | Cuthbert et al. |
| 2007/0055740 A1 | 3/2007 | Luciani et al. |
| 2007/0058332 A1 | 3/2007 | Canterbury et al. |
| 2007/0065078 A1 | 3/2007 | Jiang |
| 2007/0070598 A1 | 3/2007 | Chuang |
| 2007/0074284 A1 | 3/2007 | Woog |
| 2007/0097618 A1 | 5/2007 | Searby et al. |
| 2007/0101039 A1 | 5/2007 | Rutledge et al. |
| 2007/0120874 A1 | 5/2007 | MacInnis et al. |
| 2007/0130323 A1 | 6/2007 | Landsman et al. |
| 2007/0168593 A1 | 7/2007 | Montag et al. |
| 2008/0036780 A1 | 2/2008 | Liang et al. |
| 2008/0053770 A1 | 3/2008 | Tynyk |
| 2008/0079388 A1 | 4/2008 | Sarnowsky |
| 2008/0099646 A1 | 5/2008 | Kobara et al. |
| 2008/0100713 A1 | 5/2008 | Liu |
| 2008/0119241 A1 | 5/2008 | Dorogusker et al. |
| 2008/0126594 A1 | 5/2008 | Monks et al. |
| 2008/0194119 A1 | 8/2008 | Mori |
| 2008/0239681 A1 | 10/2008 | Ida |
| 2008/0244026 A1 | 10/2008 | Holt et al. |
| 2008/0313108 A1 | 12/2008 | Carrabis |
| 2009/0016015 A1 | 1/2009 | Seibert et al. |
| 2009/0058359 A1 | 3/2009 | Fischer et al. |
| 2009/0061675 A1 | 3/2009 | Chen |
| 2009/0066704 A1 | 3/2009 | Daniel et al. |
| 2009/0072782 A1 | 3/2009 | Randall |
| 2009/0079264 A1 | 3/2009 | Minami |
| 2009/0079416 A1 | 3/2009 | Vinden et al. |
| 2009/0125743 A1 | 5/2009 | Robertson et al. |
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0300174 A1 | 12/2009 | Floris et al. |
| 2009/0302799 A1 | 12/2009 | Marquet et al. |
| 2009/0309748 A1 | 12/2009 | Elgort et al. |
| 2010/0022285 A1 | 1/2010 | Randall et al. |
| 2010/0037283 A1 | 2/2010 | Zhu |
| 2010/0053387 A1 | 3/2010 | Kim et al. |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0102979 A1 | 4/2010 | Huang et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2010/0312938 A1 | 12/2010 | Stampfli |
| 2011/0001486 A1 | 1/2011 | Abouda et al. |
| 2011/0035443 A1 | 2/2011 | Jensen |
| 2011/0058255 A1 | 3/2011 | Weiss |
| 2011/0069445 A1 | 3/2011 | Haren et al. |
| 2011/0085816 A1 | 4/2011 | Kim |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0181238 A1 | 7/2011 | Soar |
| 2011/0182029 A1 | 7/2011 | Wu et al. |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0009820 A1 | 1/2012 | Byrne |
| 2012/0034951 A1 | 2/2012 | Jones et al. |
| 2012/0039048 A1 | 2/2012 | Mondragon et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0166115 A1 | 6/2012 | Apostolakis |
| 2012/0170203 A1 | 7/2012 | Oberpriller et al. |
| 2012/0170212 A1 | 7/2012 | Gallouzi et al. |
| 2012/0188087 A1 | 7/2012 | Wang |
| 2012/0196475 A1 | 8/2012 | Lin |
| 2012/0203949 A1 | 8/2012 | Benhard et al. |
| 2012/0229076 A1 | 9/2012 | Zhu et al. |
| 2012/0262117 A1 | 10/2012 | Ferber et al. |
| 2012/0275526 A1 | 11/2012 | Hughes |
| 2012/0278640 A1 | 11/2012 | Caglianone |
| 2012/0314360 A1 | 12/2012 | Chen et al. |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1 | 2/2013 | Holsman et al. |
| 2013/0057567 A1 | 3/2013 | Frank et al. |
| 2013/0060662 A1 | 3/2013 | Carlson et al. |
| 2013/0073882 A1 | 3/2013 | Inbaraj et al. |
| 2013/0106979 A1 | 5/2013 | Chang et al. |
| 2013/0115826 A1 | 5/2013 | Sloey et al. |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0169069 A1 | 7/2013 | Stone et al. |
| 2013/0205060 A1 | 8/2013 | Benhard et al. |
| 2013/0214931 A1 | 8/2013 | Chia |
| 2013/0257368 A1 | 10/2013 | Lau et al. |
| 2013/0262248 A1 | 10/2013 | Kim et al. |

(56) References Cited

U.S. PATENT DOCUMENTS

| | | |
|---|---|---|
| 2013/0311801 A1 | 11/2013 | Kong et al. |
| 2013/0326495 A1 | 12/2013 | Reunamaki et al. |
| 2014/0000771 A1 | 1/2014 | Sherman et al. |
| 2014/0028462 A1 | 1/2014 | Lawson |
| 2014/0028923 A1 | 1/2014 | Griffin et al. |
| 2014/0044281 A1 | 2/2014 | Ganem et al. |
| 2014/0063049 A1 | 3/2014 | Armstrong-Muntner |
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1 | 6/2014 | Wylie et al. |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0274204 A1 | 9/2014 | Williams et al. |
| 2014/0278645 A1 | 9/2014 | Davidson et al. |
| 2014/0301575 A1 | 10/2014 | Holtman et al. |
| 2014/0316584 A1 | 10/2014 | Matsuoka et al. |
| 2014/0342669 A1 | 11/2014 | Zeung et al. |
| 2014/0355200 A1 | 12/2014 | Thiers |
| 2014/0359318 A1 | 12/2014 | Liu et al. |
| 2014/0361995 A1 | 12/2014 | Halim et al. |
| 2014/0365396 A1 | 12/2014 | Kumar et al. |
| 2015/0006026 A1 | 1/2015 | Schaffer et al. |
| 2015/0009399 A1 | 1/2015 | Jonsson et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0043154 A1 | 2/2015 | Feldstein et al. |
| 2015/0046623 A1 | 2/2015 | Ramirez et al. |
| 2015/0059251 A1 | 3/2015 | Rinner et al. |
| 2015/0081381 A1 | 3/2015 | Okoba |
| 2015/0082061 A1 | 3/2015 | Ramirez et al. |
| 2015/0106814 A1 | 4/2015 | Mlke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0227177 A1 | 8/2015 | McKean |
| 2015/0236743 A1 | 8/2015 | Kennedy |
| 2015/0237191 A1 | 8/2015 | Moran et al. |
| 2015/0278739 A1 | 10/2015 | Parker et al. |
| 2015/0281627 A1 | 10/2015 | Wang et al. |
| 2015/0295440 A1 | 10/2015 | Liao |
| 2015/0333789 A1 | 11/2015 | An |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0007083 A1* | 1/2016 | Gurha .............. H04N 21/25808 725/13 |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0087670 A1 | 3/2016 | Lee |
| 2016/0091926 A1 | 3/2016 | Saxton |
| 2016/0109864 A1 | 4/2016 | Lonn |
| 2016/0134153 A1 | 5/2016 | Miller et al. |
| 2016/0173678 A1 | 6/2016 | Decamp |
| 2016/0187963 A1 | 6/2016 | Leinonen et al. |
| 2016/0190817 A1 | 6/2016 | Hartelt et al. |
| 2016/0193932 A1 | 7/2016 | Pedram |
| 2016/0195856 A1 | 7/2016 | Spero |
| 2016/0195897 A1 | 7/2016 | Robinson |
| 2016/0227381 A1 | 8/2016 | Bargetzi et al. |
| 2016/0285301 A1 | 9/2016 | Kim |
| 2016/0285310 A1 | 9/2016 | Tan et al. |
| 2016/0302320 A1 | 10/2016 | Kim et al. |
| 2016/0306616 A1 | 10/2016 | Tomppo |
| 2016/0308929 A1 | 10/2016 | Fu |
| 2016/0321333 A1 | 11/2016 | Oka |
| 2016/0364224 A1 | 12/2016 | Tuukkanen |
| 2016/0372973 A1 | 12/2016 | Fitzgerald et al. |
| 2017/0016696 A1 | 1/2017 | Koskan et al. |
| 2017/0024197 A1 | 1/2017 | Pantelka et al. |
| 2017/0025889 A1 | 1/2017 | Ormesher et al. |
| 2017/0054734 A1 | 2/2017 | Sigal et al. |
| 2017/0068913 A1 | 3/2017 | Pignataro et al. |
| 2017/0070090 A1 | 3/2017 | Miller |
| 2017/0092229 A1 | 3/2017 | Greenebaum et al. |
| 2017/0099361 A1 | 4/2017 | Digilov et al. |
| 2017/0123456 A1 | 5/2017 | Chung et al. |
| 2017/0140235 A1 | 5/2017 | Yu et al. |
| 2017/0150812 A1 | 6/2017 | Tomomatsu et al. |
| 2017/0170859 A1 | 6/2017 | Noori et al. |
| 2017/0177029 A1 | 6/2017 | Nguyen et al. |
| 2017/0205852 A1 | 7/2017 | Owens |
| 2017/0255452 A1 | 9/2017 | Barnes et al. |
| 2017/0255880 A1 | 9/2017 | Daher et al. |
| 2017/0262779 A1 | 9/2017 | Remaker |
| 2017/0302099 A1 | 10/2017 | Bolden et al. |
| 2017/0325318 A1 | 11/2017 | Wendt et al. |
| 2017/0336846 A1 | 11/2017 | Shieh et al. |
| 2017/0345290 A1 | 11/2017 | Law et al. |
| 2017/0351638 A1 | 12/2017 | Chen et al. |
| 2017/0374114 A1 | 12/2017 | Feldman |
| 2018/0017992 A1 | 1/2018 | Wylie |
| 2018/0055175 A1 | 3/2018 | Rho et al. |
| 2018/0062417 A1 | 3/2018 | Choi et al. |
| 2018/0067885 A1 | 3/2018 | Hsieh et al. |
| 2018/0074546 A1 | 3/2018 | Decamp et al. |
| 2018/0103212 A1 | 4/2018 | Epstein et al. |
| 2018/0117446 A1* | 5/2018 | Tran .................. G06F 1/163 |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0177024 A1 | 6/2018 | Mohan et al. |
| 2018/0189730 A1 | 7/2018 | Wilkinson et al. |
| 2018/0191113 A1 | 7/2018 | Byrne et al. |
| 2018/0198248 A1 | 7/2018 | Sun et al. |
| 2018/0210744 A1 | 7/2018 | Shih et al. |
| 2018/0267681 A1 | 9/2018 | Epstein |
| 2018/0324393 A1 | 11/2018 | Ryan et al. |
| 2018/0338368 A1 | 11/2018 | Pfund et al. |
| 2019/0005476 A1 | 1/2019 | Luo et al. |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0097962 A1 | 3/2019 | Young et al. |
| 2019/0138737 A1 | 5/2019 | Leipold |
| 2019/0197009 A1 | 6/2019 | Chen et al. |
| 2019/0228348 A1 | 7/2019 | O'Keefe-Sally et al. |
| 2019/0243419 A1 | 8/2019 | Charlesworth et al. |
| 2019/0243637 A1 | 8/2019 | Nachimuthu |
| 2019/0272005 A1 | 9/2019 | Wickett |
| 2019/0272141 A1 | 9/2019 | Poel et al. |
| 2019/0273754 A1* | 9/2019 | Ting .................. G06F 9/50 |
| 2019/0303342 A1* | 10/2019 | Jen .................. G06F 13/4068 |
| 2019/0317774 A1* | 10/2019 | Raghav .............. G06F 9/4411 |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0042710 A1 | 2/2020 | Liu et al. |
| 2020/0081483 A1 | 3/2020 | Laurent et al. |
| 2020/0104762 A1 | 4/2020 | Gibson et al. |
| 2020/0133368 A1* | 4/2020 | Volek .................. G06F 1/266 |
| 2020/0177596 A1 | 6/2020 | Grobelny et al. |
| 2020/0201388 A1 | 6/2020 | Spyrison et al. |
| 2020/0212694 A1 | 7/2020 | Spyrison et al. |
| 2020/0218324 A1 | 7/2020 | Decamp et al. |
| 2020/0218811 A1 | 7/2020 | Rangel-Martinez |
| 2020/0219036 A1 | 7/2020 | Decamp et al. |
| 2020/0241597 A1 | 7/2020 | Decamp et al. |
| 2020/0256902 A1 | 8/2020 | Decamp et al. |
| 2020/0257517 A1* | 8/2020 | Seater .............. G06F 1/3206 |
| 2020/0259805 A1* | 8/2020 | Grobelny .............. G06F 21/85 |
| 2020/0293634 A1 | 9/2020 | Tsao et al. |
| 2020/0301693 A1 | 9/2020 | Patel et al. |
| 2020/0314744 A1 | 10/2020 | Bhanja et al. |
| 2020/0326955 A1 | 10/2020 | Adiletta et al. |

(56) References Cited

U.S. PATENT DOCUMENTS

| | | | |
|---|---|---|---|
| 2020/0348724 A1* | 11/2020 | Vroom | G05B 9/02 |
| 2020/0364342 A1 | 11/2020 | Martinez et al. | |
| 2020/0388377 A1 | 12/2020 | Macdonald | |
| 2021/0026964 A1* | 1/2021 | Gopal | H04L 9/0897 |
| 2021/0034355 A1 | 2/2021 | Montero et al. | |
| 2021/0051298 A1 | 2/2021 | Atkins et al. | |
| 2021/0058584 A1 | 2/2021 | Decamp et al. | |
| 2021/0067365 A1 | 3/2021 | Ansari et al. | |
| 2021/0072792 A1 | 3/2021 | Decamp et al. | |
| 2021/0073155 A1 | 3/2021 | Decamp et al. | |
| 2021/0097565 A1 | 4/2021 | Subbloie et al. | |
| 2021/0119930 A1* | 4/2021 | Debbage | H04L 1/1642 |
| 2021/0181794 A1 | 6/2021 | Chung et al. | |
| 2021/0191462 A1 | 6/2021 | Decamp et al. | |
| 2021/0233010 A1 | 7/2021 | Decamp et al. | |
| 2021/0258538 A1 | 8/2021 | Decamp, II et al. | |
| 2021/0286580 A1 | 9/2021 | Tian | |
| 2021/0326763 A1* | 10/2021 | Bernat | G06N 20/00 |
| 2022/0011382 A1 | 1/2022 | Chiang et al. | |
| 2022/0021227 A1 | 1/2022 | Spyrison et al. | |
| 2022/0116224 A1* | 4/2022 | Guim Bernat | H04L 9/3239 |
| 2022/0188419 A1* | 6/2022 | Stremlau | G06F 8/65 |
| 2022/0210225 A1* | 6/2022 | Shilimkar | H04L 47/2408 |
| 2022/0261056 A1 | 8/2022 | Motoi et al. | |
| 2023/0006833 A1* | 1/2023 | Stolbikov | H04L 9/3239 |
| 2023/0019303 A1* | 1/2023 | Suryanarayana | G06F 21/31 |

FOREIGN PATENT DOCUMENTS

| | | |
|---|---|---|
| CN | 104094187 | 10/2014 |
| CN | 104838558 | 8/2015 |
| CN | 105593782 | 5/2016 |
| CN | 205651721 U | 10/2016 |
| CN | 106707834 | 5/2017 |
| CN | 107274660 A | 10/2017 |
| CN | 107702282 A | 2/2018 |
| CN | 107702282 A1 | 2/2018 |
| DE | 102013104216 | 11/2013 |
| DE | 202017102528 U1 | 5/2017 |
| DE | 102016200482 | 7/2017 |
| EP | 1085400 A2 | 3/2001 |
| EP | 2645343 A2 | 10/2013 |
| EP | 2722728 | 4/2014 |
| EP | 2722728 A1 | 4/2014 |
| EP | 2823372 | 1/2015 |
| EP | 2929613 | 10/2015 |
| EP | 3030948 | 6/2016 |
| EP | 3087476 | 11/2016 |
| EP | 3226182 A1 | 10/2017 |
| GB | 2457252 A | 8/2009 |
| GB | 2513197 A | 10/2014 |
| IN | 201617004084 | 12/2015 |
| IN | 201406041 | 1/2016 |
| JP | 2006228234 A | 8/2006 |
| JP | 2007172667 A | 7/2007 |
| JP | 2013239178 | 11/2013 |
| JP | 6110878 | 5/2015 |
| JP | 2016504900 | 2/2016 |
| JP | 2016095633 A | 5/2016 |
| JP | 2016532928 A | 10/2016 |
| KR | 1020090069890 A | 7/2009 |
| KR | 20100000082 U | 1/2010 |
| KR | 20140069684 A | 6/2014 |
| KR | 1020140069684 | 6/2014 |
| KR | 101452319 | 10/2014 |
| KR | 20150091362 | 8/2015 |
| KR | 20150130842 A | 11/2015 |
| KR | 1020150130842 | 11/2015 |
| KR | 20160035397 A | 3/2016 |
| KR | 1020160121116 A | 10/2016 |
| KR | 20170075201 | 7/2017 |
| KR | 2020100000082 | 1/2020 |
| RU | 2630376 | 7/2017 |
| TW | 387182 B1 | 2/2013 |
| TW | 201347581 | 11/2013 |
| TW | 201823978 A | 7/2018 |
| WO | 03030304 A2 | 4/2003 |
| WO | 2005003983 A1 | 1/2005 |
| WO | 2008109193 A1 | 9/2008 |
| WO | 2011040904 A1 | 4/2011 |
| WO | 2011138581 A2 | 11/2011 |
| WO | 2013024855 A1 | 2/2013 |
| WO | 2013033573 A2 | 3/2013 |
| WO | 2014172678 A1 | 10/2014 |
| WO | 2015053976 A1 | 4/2015 |
| WO | 2016011566 A1 | 1/2016 |
| WO | 2016040781 A1 | 3/2016 |
| WO | 2017069490 A1 | 4/2017 |
| WO | 2017140474 | 8/2017 |
| WO | 2017167709 A1 | 10/2017 |
| WO | 20018216004 A1 | 11/2018 |
| WO | 2019018007 | 1/2019 |
| WO | 2019067600 A1 | 4/2019 |
| WO | 2019072244 A1 | 4/2019 |
| WO | 2019118130 A1 | 6/2019 |
| WO | 2019161138 A1 | 8/2019 |
| WO | 2019173346 | 9/2019 |
| WO | 2020117834 A1 | 6/2020 |
| WO | 2020142525 A1 | 7/2020 |
| WO | 2020172802 A1 | 9/2020 |
| WO | 2020202181 A1 | 10/2020 |
| WO | 2020231583 A1 | 11/2020 |
| WO | 2020231624 A1 | 11/2020 |
| WO | 2020231744 A1 | 11/2020 |
| WO | 2020251546 A1 | 12/2020 |
| WO | 2021035156 A1 | 2/2021 |
| WO | 2021050215 A1 | 3/2021 |
| WO | 2021050575 A1 | 3/2021 |

OTHER PUBLICATIONS

PCT/US2012/023717, International Search Report and Written Opinion, Aug. 30, 2012, 9 pgs.
PCT/US2014/017434, International Search Report and Written Opinion, Jun. 30, 2014, 8 pgs.
PCT/US2015/065730, International Search Report and Written Opinion, Apr. 6, 2016, 16 pgs.
PCT/US2017/048367, International Search Report and Written Opinion, Oct. 27, 2017, 15 pgs.
PCT/US2018/017232, International Search Report and Written Opinion, May 21, 2018, 13 pgs.
PCT/US2019/067581, International Search Report and Written Opinion, Apr. 23, 2020, 10 pages.
PCT/US2019/069120, International Search Report and Written Opinion, Apr. 29, 2020, 11 pages.
PCT/US2020/046703, International Search Report and Written Opinion, Jan. 13, 2021, 12 pages.
PCT/US2020/046703, Invitation to Pay Additional Fees and, Where Applicable, Protest Fee, Oct. 29, 2020, 2 pages.
PCT/US2020/047448, International Search Report and Written Opinion, Nov. 20, 2020, 13 pages.
PCT/US2020/049980, International Search Report and Written Opinion, Nov. 27, 2020, 15 pages.
Wikipedia, "USB", https://web.archive.org/web/20141024053934/https://en.wikipedia.org/wiki/USB, Oct. 24, 2014, 42 pages.
U.S. Appl. No. 16/446,440, Notice of Allowance, Mar. 31, 2022, 8 pages.
U.S. Appl. No. 16/833,089, Non-Final Office Action, Apr. 8, 2022, 23 pages.
U.S. Appl. No. 13/365,754, Final Office Action, Dec. 27, 2013, 18 pgs.
U.S. Appl. No. 13/365,754, Notice of Allowance, Feb. 4, 2015, 8 pgs.
U.S. Appl. No. 13/365,754, Final Office Action, Jun. 10, 2014, 22 pgs.
U.S. Appl. No. 13/365,754, Non-Final Office Action, May 13, 2014, 18 pgs.
U.S. Appl. No. 13/365,754, Non-Final Office Action, Sep. 10, 2013, 15 pgs.

(56) References Cited

OTHER PUBLICATIONS

U.S. Appl. No. 13/365,754 , Non-Final Office Action, Sep. 17, 2014, 25 pgs.
U.S. Appl. No. 13/786,038 , Non-Final Office Action, Sep. 18, 2014, 24 pgs.
U.S. Appl. No. 14/634,196 , Non-Final Office Action, Sep. 7, 2016, 25 pgs.
Ganesh, "Visible Engergy UFO Power Center Smart Power Strip Review", AnandTech, http://www.anandtech.com/show/6413/visible-energy-ufo-power-center-smart-power-stripreview, Oct. 26, 2012.
U.S. Appl. No. 14/923,833 , Final Office Action, Aug. 9, 2017, 22 pgs.
U.S. Appl. No. 14/923,833 , Notice of Allowance, Dec. 18, 2017, 5 pgs.
U.S. Appl. No. 14/923,833 , Non-Final Office Action, Mar. 2, 2017, 22 pgs.
U.S. Appl. No. 14/923,833 , Non-Final Office Action, Nov. 1, 2016, 14 pgs.
U.S. Appl. No. 14/970,318 , Notice of Allowance, Dec. 6, 2017, 11 pgs.
U.S. Appl. No. 14/970,318 , Non-Final Office Action, Feb. 6, 2017, 21 pgs.
U.S. Appl. No. 14/970,318 , Non-Final Office Action, Jul. 11, 2017, 15 pgs.
U.S. Appl. No. 14/970,318 , Final Office Action, Jul. 11, 2017, 25 pgs.
U.S. Appl. No. 14/970,318 , Non-Final Office Action, Oct. 14, 2016, 13 pgs.
U.S. Appl. No. 14/970,318 , Advisory Action, Sep. 28, 2017, 3 pgs.
U.S. Appl. No. 15/261,204 , Non-Final Office Action, Apr. 30, 2018, 20 pgs.
U.S. Appl. No. 15/261,204 , Advisory Action, Feb. 1, 2019, 7 pages.
U.S. Appl. No. 15/261,204 , Notice of Allowance, Feb. 4, 2020, 8 pages.
U.S. Appl. No. 15/261,204 , Non-Final Office Action, Jun. 27, 2019, 20 pages.
U.S. Appl. No. 15/261,204 , Final Office Action, Nov. 2, 2018, 22 pgs.
U.S. Appl. No. 15/655,669 , Final Office Action, May 16, 2019, 16 pages.
U.S. Appl. No. 15/655,699 , Advisory Action, Aug. 1, 2019, 4 pages.
U.S. Appl. No. 15/655,699 , Final Office Action, Feb. 7, 2020, 8 pages.
U.S. Appl. No. 15/655,699 , Notice of Allowance, Mar. 6, 2020, 7 pages.
U.S. Appl. No. 15/655,699 , Non-Final Office Action, Nov. 19, 2018, 37 pgs.
U.S. Appl. No. 15/655,699 , Non-Final Office Action, Sep. 6, 2019, 18 pages.
U.S. Appl. No. 15/905,241 , Non-Final Office Action, Nov. 2, 2018, 34 pgs.
U.S. Appl. No. 16/029,339 , Final Office Action, Apr. 19, 2019, 14 pages.
U.S. Appl. No. 16/029,339 , Non-Final Office Action, Aug. 8, 2019, 14 pages.
U.S. Appl. No. 16/029,339 , Notice of Allowance, Dec. 4, 2019, 10 pages.
U.S. Appl. No. 16/029,339 , Non-Final Office Action, Nov. 2, 2018, 28 pgs.
U.S. Appl. No. 16/240,124 , Notice of Allowance, Feb. 22, 2021, 9 pages.
U.S. Appl. No. 16/240,124 , Non-Final Office Action, Nov. 13, 2020, 30 pages.
U.S. Appl. No. 16/446,440 , Non-Final Office Action, Sep. 16, 2021, 15 pages.
U.S. Appl. No. 16/721,403 , Non-Final Office Action, Feb. 1, 2022, 17 pages.
U.S. Appl. No. 16/849,799 , Notice of Allowance, Oct. 8, 2021, 5 pages.
U.S. Appl. No. 16/849,858 , Notice of Allowance, Jan. 22, 2021, 8 pages.
U.S. Appl. No. 16/849,858 , Non-Final Office Action, Jun. 26, 2020, 12 pages.
U.S. Appl. No. 16/999,778 , Notice of Allowance, Mar. 19, 2021, 13 pages.
U.S. Appl. No. 16/999,778 , Non-Final Office Action, Nov. 13, 2020, 16 pages.
U.S. Appl. No. 17/308,351 , Non-Final Office Action, Nov. 15, 2021, 14 pages.
17849313.6 , Extended European Search Report, Mar. 25, 2020, 8 pages.
Agnihotri, Mohit , et al., "Topology Formation in Mesh Networks Considering Role Suitability", Workshop on Device Communications for 5G Networks, WD5G, 2016, 7 pages.
Dell , "Dell Docking Station WD15 User Guide", 2015, 31 pages.
Dong, Wei , "Web-based Building Energy Consumption Monitoring and Conservation Service", 4th International Conference on Mechatronics, Materials, Chemistry and Computer Engineering (ICMMCCE 2015), pp. 3036-3040.
Fink, Thomas , "Toshiba Dynadock V Review", Laptop Magazine, retrieved from the Internet on Dec. 21, 2013, at <http://www.laptopmag.com/review/accessories/Toshiba-dynadock-v.aspx>, Aug. 9, 2010, pp. 1-2.
U.S. Appl. No. 17/308,351, Notice of Allowance, Mar. 29, 2022, 5 pages.
Extended European Search Report for European Patent Application No. 19893787.2, mailed Jul. 28, 2022, 8 pages.
Extended European Search Report for European Patent Application No. 19900419.3, mailed Jul. 29, 2022, 9 pages.
Chau et al., 2015, "STAQ I Modular Powerbank, Wifi Memory, Audio & Dock System", AEGLO, [ online], Available from: https ://www.kickstarter.com/projects/ aeglobrand/worlds-first-modular-phone-dock-power-and-multi-me/description [Accessed Jun. 22, 2022],22 pages.
Goodbros., et al., "Minimal Size Privacy Protecting WebCam cover Spyslide" (with English translation), NAVER blog, https://m.post.naver.com/viewer/postView.nhn?volumeNo=7636827&memberNo=36238167&vType=VERTICAL , May 15, 2017 ,32 pages.
PCT/US2019/020762, et al., International Search Report and Written Opinion , Jun. 13, 2019 , 11 pages.
PCT/US2019/064274, et al., International Search Report and Written Opinion ,Mar. 23, 2020 , 10 pages.
Tech Armor, et al., Tech Armor Macbook Pro Privacy Screen Protector, Privacy Apple MacBook Pro Retina, https://www.amazon.com/Macbook-Privacy-Protector-Tech-Armor/dp/B01MZ1W2Y2 , Dec. 20, 2016 , 9 pages.
Vmei, et al., Echo Show Screen Protecto, https://www.amazon.com/Protector-Important-Everyones-Safe-Designed-VMEI/dp/B075W6Y— Retrieved Jul. 30, 2019 ,2017.
European Patent Office, Extended European Search Report Received for European Patent Application No. 20863056.6, mailed Jul. 28, 2023, 14 pages.
European Search Report for European Patent Application No. 20862297.7, mailed Jul. 21, 2023, 10 pages.
Extended European Search Report for European Patent Application No. 19906961.8, mailed Aug. 29, 2022, 8 pages.

\* cited by examiner

INDEPENDENTLY UPGRADEABLE DOCKING STATIONS

TECHNICAL FIELD

This application relates generally to docking stations, including docking stations that are independently upgradeable (e.g., can be upgraded without the use and/or presence of a host device attached to the docking station).

BACKGROUND

Docking stations for electronic host devices may be configured to allow a host device connected to the docking station to operate with and/or use one or more external devices (also) connected the docking station. Examples of host devices may include a laptop, a tablet, a smartphone, etc. Examples of external devices may include a display monitor, a mouse, a keyboard, a network switch, a universal serial bus (USB) device, etc. Further, the docking station may provide power to the host device that the host device can use to operate (e.g., perform user functions, charge a battery, etc.).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
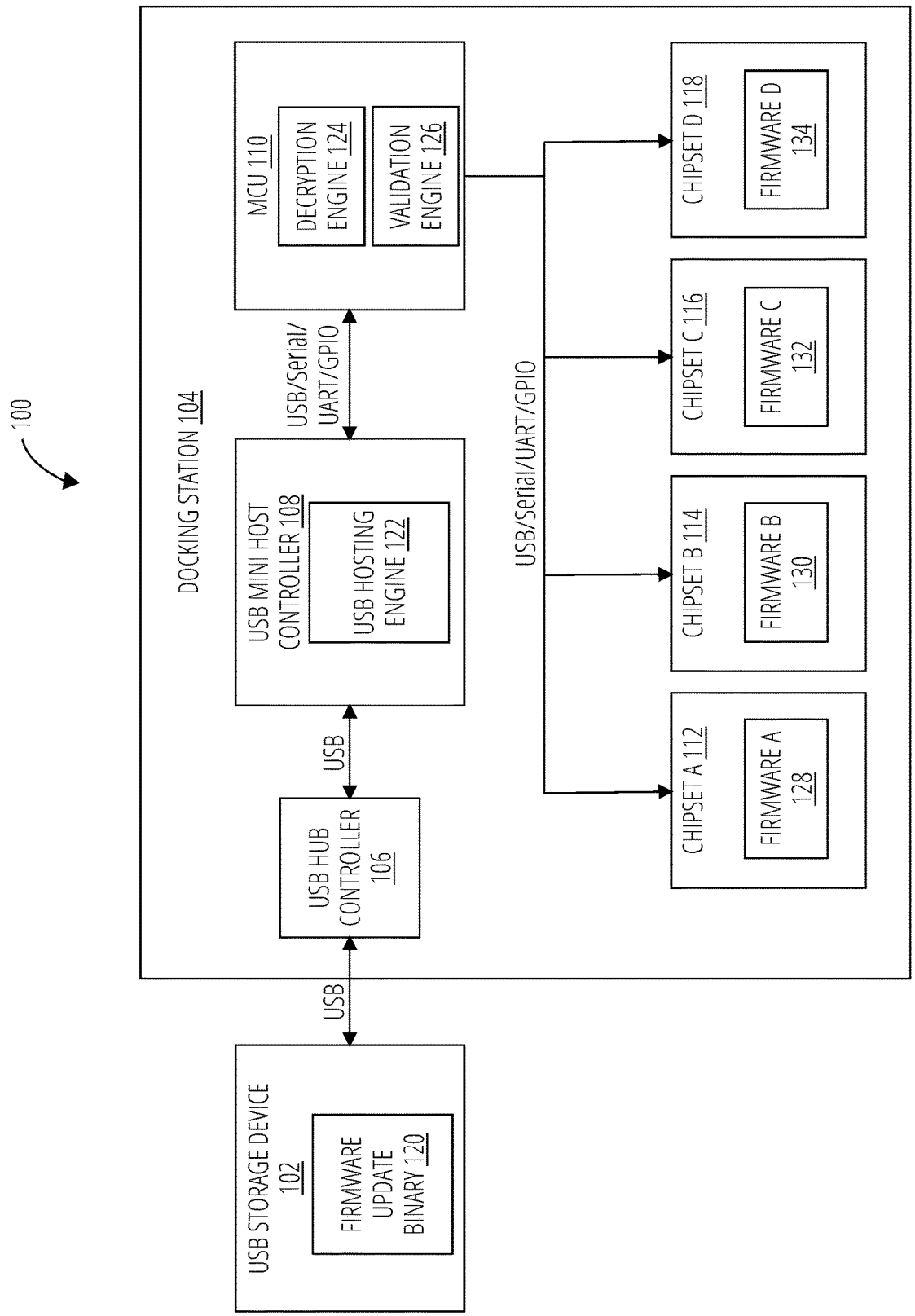
FIG. 1 illustrates a system including a universal serial bus (USB) storage device and a docking station, according to an embodiment.

Docking stations may include one or more chipsets that operate to interface the docking station with a host device using the docking station. One or more of the chipsets may be responsible for transporting data as between the host device and the docking station (in either direction), and/or for signaling for or otherwise controlling power distribution from the docking station to the host device. The chipsets may perform these operations relative to one or more ports on the docking station. For example, in the case of a host device that is connected to a universal serial bus (USB) Type C (USB-C) port on the docking station, a first chipset may be responsible for transporting video data through the USB-C port as between the host device and the docking station, a second chipset may be responsible for transporting power through the USB-C port from the docking station to the host device, and a third chipset may be responsible for transporting data from an external device attached to the docking station from the docking station to the host device through the USB-C port. It is also contemplated that multiple ports of the docking station may be so used between one (or more) host devices. The operation(s) of a chipset as between a host device and the docking station may be referred to herein as "chipset services." It is contemplated that a docking station may comprise any combination of such chipset(s) that are configured to provide any corresponding combination of chipset service(s).

The chipsets of the docking station may operate their services according to a firmware for the chipset. The firmware may be stored on a memory of the chipset (or another memory found on the docking station that corresponds to the associated chipset), and may, when used to configure the chipset, enable the chipset to perform its associated services. In some instances, a firmware for a chipset of the docking station may be updated (or upgraded). Such updates may improve the operation of the chipset (e.g., make the chipset more efficient and/or accurate in performing its associated service(s) for host device(s), enable the chipset to perform new services for host device(s), and/or enable the chipset to operate with a new kind of host device, etc.).

In some cases, docking station chipset firmware updates may be performed while a host device is attached to the docking station. This may be because in some instances a host device is used to perform the firmware update by leveraging communications between the host device and the docking station. However, a system for docking station chipset firmware updates that uses a host device to update the chipset(s) of the docking station may cause the interruption of valuable worktime corresponding to the docking station, as, for example, a host device capable of updating the docking station chipset(s) must occupy the docking station to perform the update. Systems depending on host devices to perform docking station chipset firmware updates may also incur logistics concerns, in that the scheduling of updates at the right time for various groups in different locations (and any placement of human operators to perform the updates) may be difficult and/or time-consuming, and may need to be done outside the regular workday to avoid interruption.

Further, systems depending on host devices to perform docking station chipset firmware updates may depend on specific types of host devices. For example, if the chipset firmware update software for a docking station is Microsoft™ Windows™ based, the logistics of providing a Windows™ based host device at the docking station in order to perform the update may not be convenient (e.g., for companies that regularly equip their users with non-Windows™ based computers). Finally, systems depending on host devices to perform docking station chipset firmware updates may (in cases undesirably) allow chipset firmware to be changed via a host device with no (or insufficient) security protections.

It may therefore be beneficial to develop systems and methods of a docking station chipset firmware updating solution that does not require the use of a host device. Such methods may enable the updating of one or more chipsets of a docking station without the productivity, logistical, compatibility, and/or security concerns discussed above (among other possible issues).

FIG. 1 illustrates a system 100 including a USB storage device 102 and a docking station 104, according to an embodiment. As illustrated, the USB storage device 102 may include a firmware update binary 120. The docking station 104 may include a USB hub controller 106, a USB mini host controller 108 having a USB hosting engine 122, a microcontroller unit (MCU) 110 having a decryption engine 124 and a validation engine 126, and a number of chipsets, each operating according to its respective firmware. In the example of FIG. 1, the docking station 104 comprises a chipset A 112 having firmware A 128, a chipset B 114 having firmware B 130, a chipset C 116 having firmware C 132, and a chipset D 118 having firmware D 134.

The USB storage device 102 may contain chipset firmware update data useable to perform a firmware update for one or more chipsets of the docking station 104. For example, the USB storage device 102 may contain a firmware update binary 120 that can be used by the docking station 104 to update one or more of the chipsets 112 through 118. The USB storage device 102 may be any type of storage device capable of communicating over USB, such as, for example, a flash drive, a hard drive, a solid state drive, etc.

It is contemplated that in some embodiments, the firmware update binary 120 is encrypted to protect the contents of the firmware update binary 120. Further, it is contemplated that in some embodiments, the firmware update binary 120 may be signed such that the integrity of the firmware update binary 120 can be verified by the docking station 104.

As illustrated, the USB storage device 102 communicates with the USB hub controller 106 of the docking station 104 via a USB interface. For example, each of the USB storage device 102 and the docking station 104 may include respective USB ports corresponding to the USB interface (e.g., a USB-A port, a USB-C port, etc.) that can be used to physically connect the USB storage device 102 to the USB hub controller 106 of the docking station 104. This USB interface may be an example of a physical communication interface used by the docking station 104.

The USB hub controller 106 may be responsible for managing signaling that occurs according to this physical connection. The USB hub controller 106 communicates (via a second USB interface, as illustrated) with a USB mini host controller 108 of the docking station 104. The USB mini host controller 108 may include a USB hosting engine 122 that, when operated by the USB mini host controller 108, can host the USB storage device 102 for the docking station 104 (via the USB hub controller 106). In other words, the USB hosting engine 122 includes instructions that, when operated by the USB mini host controller 108 of the docking station 104, configure the docking station 104 to read and/or write data to and/or from the USB storage device 102. This may occur independently of any host device that is (or is not) also connected to the docking station 104.

Then, through the operation of the USB hosting engine 122, the USB hub controller 106 receives the firmware update binary 120 from the USB storage device 102 (e.g., via a USB connection to the USB storage device 102) and then passes the firmware update binary 120 to the USB mini host controller 108 (e.g., via the second USB interface, as illustrated).

As shown in FIG. 1, the USB mini host controller 108 may be in communication with the MCU 110 via one of a (third) USB interface, a serial interface, a universal asynchronous receiver-transmitter (UART) interface, or a general purpose input/output (GPIO) interface that may exist between the USB mini host controller 108 and the MCU 110. The USB mini host controller 108 may pass the firmware update binary 120 to the MCU 110 according to an interface used between the two.

Upon receipt of the firmware update binary 120, the MCU 110 may determine whether the firmware update binary 120 is encrypted. If so, the decryption engine 124 of the MCU 110 is used to decrypt the firmware update binary 120 as received. In some embodiments, if the firmware update binary 120 cannot be decrypted, the firmware update binary 120 is not further used and is discarded. This decryption may be performed without any input from any host device attached to the docking station 104 (which may or may not be present)

Further, the MCU 110 may determine whether the firmware update binary 120 is signed. If so, the validation engine 126 of the MCU 110 may be used to validate the signature of the firmware update binary 120 as received, thereby ensuring that the firmware update binary 120 is valid. In some embodiments, if the firmware update binary 120 is not signed, or if the signature is determined to be invalid, the firmware update binary 120 is not further used and is instead discarded. This validation may be performed without any input from any host device attached to the docking station 104 (which may or may not be present).

Once the firmware update binary 120 is decrypted and/or validated, the MCU 110 may proceed to perform a firmware update for one or more of the chipset A 112, the chipset B 114, the chipset C 116, and/or the chipset D 118 using the firmware update binary 120. This process may change or replace the firmware of the respective chipset. For example, it may be that the firmware update binary 120 is operable to change or replace the firmware A 128 of chipset A 112. In other cases, it may be that the firmware update binary 120 is operable to change or replace each of the firmware A 128 of chipset A 112 and the firmware C 132 of chipset C 116. In other cases, it may be that the firmware update binary 120 is operable to change or replace the firmware of all chipsets of the docking station 104 (e.g., change or replace the firmware A 128 of the chipset A 112, the firmware B 130 of the chipset B 114, the firmware C 132 of the chipset C 116, and the firmware D 134 of the chipset D 118).

As illustrated, the MCU 110 may communicate with the chipsets 112 through 118 via one or more of a USB interface, a serial interface, a UART interface, or a GPIO interface. In some embodiments, different interfaces could be used for different chipsets (e.g., the MCU 110 could communicate with the chipset A 112 via a serial interface, while the MCU 110 communicates with the chipset D 118 via a GPIO interface). According to the operability of the firmware update binary 120, the firmware update is performed for a respective chipset via the interface between the chipset and the MCU 110.

The firmware update process for the one or more chipsets 112 through 118 can be performed without any input from any host device of the docking station 104. For example, the USB mini host controller 108 may operate the USB hosting engine 122 to access the firmware update binary 120 on the USB storage device 102 and eventually communicate the firmware update binary 120 to the MCU 110 independently of any host device useable with the docking station 104. Further, the MCU 110 may then perform a corresponding firmware update for any of the chipsets 112 through 118 independently of any host device useable with the docking station 104. In other words, the firmware update process described in relation to the system 100 can happen independently of whether or not any host device is connected to the docking station 104 at the time of the firmware update.

Further, it is anticipated that the firmware update process described above could be performed while the docking station 104 (also) continues to perform the functions of the docking station 104 for an attached host device (in the case that one is attached to the docking station 104 at the time of the firmware update). For example, the USB storage device 102 could be inserted into the docking station 104, and the MCU 110 may receive the firmware update binary 120 from the USB storage device 102 and use it to perform a corresponding firmware update, while the docking station 104 continues to, for example, transport data between the host device and the docking station 104 and/or transport power from the docking station 104 to the host device.

It is contemplated that in alternative embodiments to FIG. 1, an MCU of the docking station 104 having the functions of the MCU 110 may itself (also) include a USB mini host controller and/or a USB hub controller. In such cases, the USB interface illustrated in FIG. 1 between the USB hub controller 106 and the USB mini host controller 108 may not be used, and/or the one or more of the USB, serial, UART, and/or GPIO interface(s) illustrated between the USB mini host controller 108 and the MCU 110 in FIG. 1 may not be used. Further, in cases where the functions of a USB hub controller and a USB mini host controller are incorporated into such an MCU, a USB port to which a USB storage device is connected may correspond to a USB interface proceeding directly to that MCU (with the supporting operations of the USB hosting engine in such cases being performed directly by that MCU).

Figure 2:
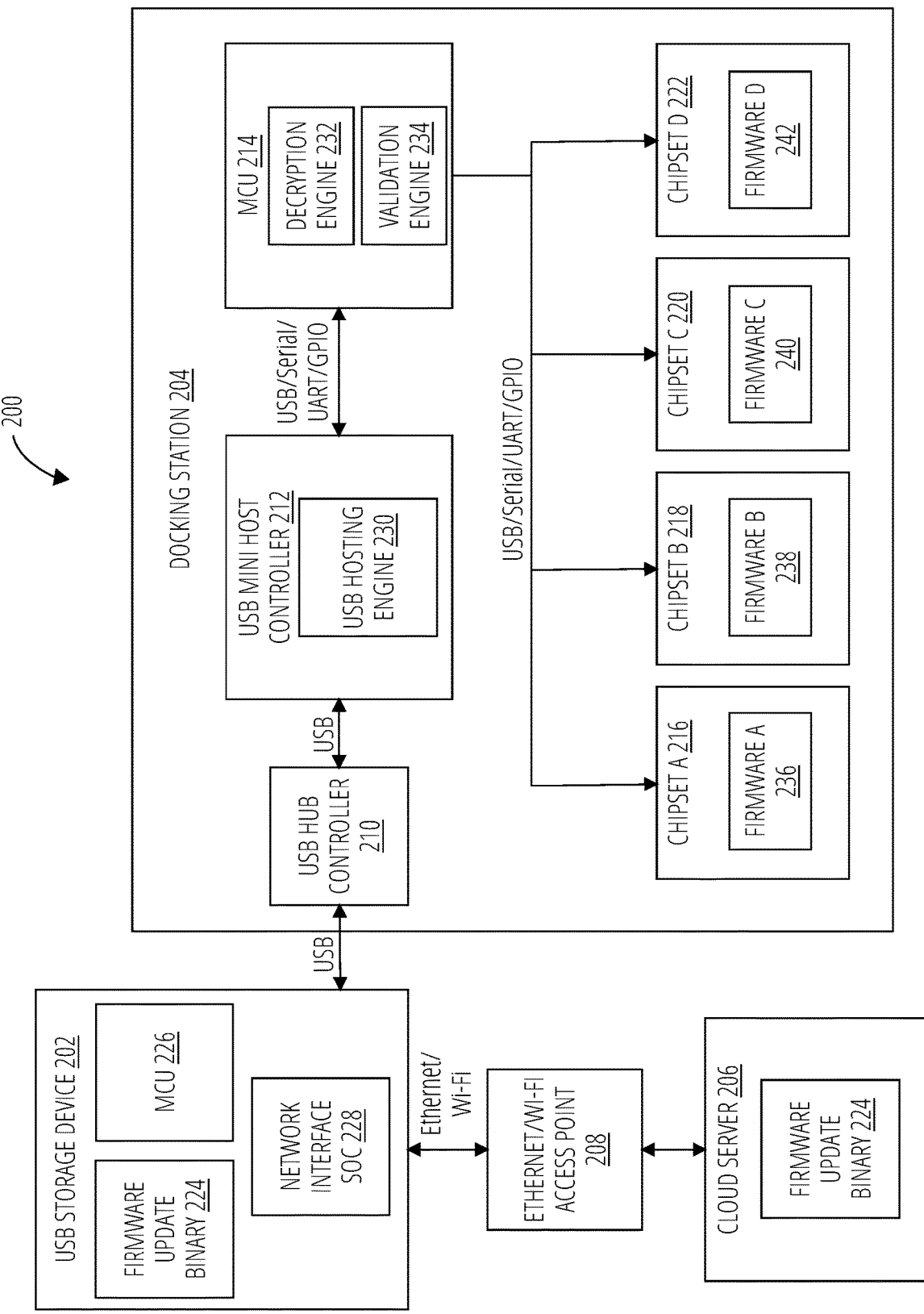
FIG. 2 illustrates a system including a USB storage device, a docking station, a cloud server, and an Ethernet/Wi-Fi access point according to an embodiment.

FIG. 2 illustrates a system 200 including a USB storage device 202, a docking station 204, a cloud server 206, and an Ethernet/Wi-Fi access point 208 according to an embodiment. As illustrated, the USB storage device 202 may include a firmware update binary 224, an MCU 226, and a network interface system on a chip (SoC) 228. The docking station 204 may include a USB hub controller 210, a USB mini host controller 212 having a USB hosting engine 230, an MCU 214 having a decryption engine 232 and a validation engine 234, and a number of chipsets, each operating according to its respective firmware. In the example of FIG. 2, the docking station 204 comprises a chipset A 216 having firmware A 236, a chipset B 218 having firmware B 238, a chipset C 220 having firmware C 240, and a chipset D 222 having firmware D 242. The cloud server 206 may include the firmware update binary 224 (which may be the same firmware update binary 224 as that found on the USB storage device 202).

The cloud server 206 may host a pre-determined and/or generally accessible network location (e.g., on the Internet) where chipset firmware update data useable to perform a firmware update for one or more chipsets of the docking station 204 may be found. The firmware update binary 224 may be an example of such chipset firmware update data. The firmware update binary 224 (as found on the cloud server 206) may be kept up-to-date by, e.g., a manufacturer or provider of the other elements of the system 200 (e.g., a manufacturer/provider of either or both of the USB storage device 202 and/or the docking station 204). Accordingly, it may be understood in some cases that the firmware update binary 224 as found on the cloud server 206 is an up-to-date or "production" firmware update binary 224 for updating one or more chipsets of the docking station 204.

The cloud server 206 may send the firmware update binary 224 to the Ethernet/Wi-Fi access point 208 (e.g., via the Internet). The Ethernet/Wi-Fi access point 208 may be an access point that is local to the USB storage device 202. For example, it may be an access point that is within a Wi-Fi communication range with the general location of the USB storage device 202, or an access point physically situated relatively near to the USB storage device 202 such that a physical connection (e.g., an Ethernet cable) can feasibly be run between the Ethernet/Wi-Fi access point 208 and the general location of the USB storage device 202.

The network interface SoC 228 of the USB storage device 202 may include any connectors, circuitry, and firmware for receiving network communications (e.g., a "network interface") from an access point external to the docking station USB storage device 202 (such as the Ethernet/Wi-Fi access point 208). For example, the network interface SoC 228 may include one or more antenna(s) and related circuitry and firmware for a Wi-Fi interface between the network interface SoC 228 and the Ethernet/Wi-Fi access point 208. Additionally or alternatively, the network interface SoC 228 may include an RJ-45 port and related circuitry and firmware for an Ethernet interface (facilitated by an Ethernet cable) between the network interface SoC 228 and the Ethernet/Wi-Fi access point 208.

Under instructions from the MCU 226, the USB storage device 202 may use the network interface SoC 228 to communicate with the cloud server 206 via the Ethernet/Wi-Fi access point 208. As part of this communication, the USB storage device 202 may be able to receive or download the firmware update binary 224 from the cloud server 206 (accordingly, it may be understood that each of the cloud server 206 and the USB storage device 202 has a copy of the same firmware update binary 224, as illustrated). The MCU 226 may be configured to cause this behavior by the USB storage device 202 as part of ensuring that a firmware update binary as stored at the USB storage device 202 matches the firmware update binary 224 as stored on the cloud server 206 (e.g., so that it can update or replace the firmware update binary as stored at the USB storage device 202 to match the firmware update binary 224 as stored on the cloud server 206). Accordingly, whenever this behavior occurs, because the firmware update binary 224 on the cloud server 206 is kept up-to-date as described above, the corresponding firmware update binary 224 on the USB storage device 202 is also (as a result of this behavior) kept up-to-date.

The MCU may perform a check with the cloud server (via the Ethernet/Wi-Fi access point 208) whether the USB storage device 202 has a firmware update binary that matches a firmware update binary found on the cloud server 206. As a first example of such a check, there may be cases where the MCU determines that a USB storage device 202 device does not yet have a firmware update binary (e.g., the firmware update binary 224, as illustrated in FIG. 2, or any other firmware update binary, may not yet be present on the USB storage device 202). In such cases, the MCU triggers the above-described download behavior to cause the USB storage device 202 to obtain the firmware update binary 224 from the cloud server 206.

In a second example of such a check involving cases where the USB storage device 202 already has a firmware update binary, the MCU 226 may communicate with the cloud server 206 to check whether the firmware update binary 224 on the cloud server 206 matches the firmware update binary that is stored on the USB storage device 202, and, if not, it causes the USB storage device 202 to perform the above-described download behavior to obtain the firmware update binary 224 from the cloud server. The firmware update binary stored on the USB storage device 202 is then matched to and/or replaced with the firmware update binary 224).

Such checks check may be performed by the MCU 226 of the USB storage device 202, for example, on a configured (e.g., periodic) basis, whenever the USB storage device 202 connects to an Ethernet/Wi-Fi access point (such as the Ethernet/Wi-Fi access point 208) via a network interface (such as the network interface SoC 228), and/or whenever the USB storage device 202 connects to a docking station 204 and prior to providing the firmware update binary 224 to the docking station 204 (as will be described).

Then, the firmware update binary 224 (e.g., the up-to-date copy present on the USB storage device 202) can be used by the docking station 204 to update one or more of the chipsets 216 through 222. The USB storage device 202 may be any type of storage device capable of communicating over USB, such as, for example, a flash drive, a hard drive, a solid state drive, etc.

It is contemplated that in some embodiments, the firmware update binary 224 is encrypted to protect the contents of the firmware update binary 224. Further, it is contemplated that in some embodiments, the firmware update binary 224 may be signed such that the integrity of the firmware update binary 224 can be verified by the docking station 204.

As illustrated, the USB storage device 202 communicates with the USB hub controller 210 of the docking station 204 via a USB interface. For example, each of the USB storage device 202 and the docking station 204 may include respective USB ports corresponding to the USB interface (e.g., a USB-A port, a USB-C port, etc.) that can be used to physically connect the USB storage device 202 to the USB hub controller 210 of the docking station 204. This USB interface may be an example of a physical communication interface used by the docking station 204.

The USB hub controller 210 may be responsible for managing signaling that occurs according to this physical connection. The USB hub controller 210 communicates (via a second USB interface, as illustrated) with a USB mini host controller 212 of the docking station 204. The USB mini host controller 212 may include a USB hosting engine 230 that, when operated by the USB mini host controller 212, can host the USB storage device 202 for the docking station 204 (via the USB hub controller 210). In other words, the USB hosting engine 230 includes instructions that, when operated by the USB mini host controller 212 of the docking station 204, configure the docking station 204 to read and/or write data to and/or from the USB storage device 202. This may occur independently of any host device that is (or is not) also connected to the docking station 204.

Then, through the operation of the USB hosting engine 230, the USB hub controller 210 receives the firmware update binary 224 from the USB storage device 202 (e.g., via a USB connection to the USB storage device 202) and then passes the firmware update binary 224 to the USB mini host controller 212 (e.g., via the second USB interface, as illustrated).

As shown in FIG. 2, the USB mini host controller 212 may be in communication with the MCU 214 via one of a (third) USB interface, a serial interface, a universal asynchronous receiver-transmitter (UART) interface, or a general purpose input/output (GPIO) interface that may exist between the USB mini host controller 212 and the MCU 214. The USB mini host controller 212 may pass the firmware update binary 224 to the MCU 214 according to an interface used between the two.

Upon receipt of the firmware update binary 224, the MCU 214 may determine whether the firmware update binary 224 is encrypted. If so, the decryption engine 232 of the MCU 214 is used to decrypt the firmware update binary 224 as received. In some embodiments, if the firmware update binary 224 cannot be decrypted, the firmware update binary 224 is not further used and is discarded. This decryption may be performed without any input from any host device attached to the docking station 204 (which may or may not be present)

Further, the MCU 214 may determine whether the firmware update binary 224 is signed. If so, the validation engine 234 of the MCU 214 may be used to validate the signature of the firmware update binary 224 as received, thereby ensuring that the firmware update binary 224 is valid. In some embodiments, if the firmware update binary 224 is not signed, or if the signature is determined to be invalid, the firmware update binary 224 is not further used and is instead discarded. This validation may be performed without any input from any host device attached to the docking station 204 (which may or may not be present).

Once the firmware update binary 224 is decrypted and/or validated, the MCU 214 may proceed to perform a firmware update for one or more of the chipset A 216, the chipset B 218, the chipset C 220, and/or the chipset D 222 using the firmware update binary 224. This process may change or replace the firmware of the respective chipset. For example, it may be that the firmware update binary 224 is operable to change or replace the firmware A 236 of chipset A 216. In other cases, it may be that the firmware update binary 224 is operable to change or replace each of the firmware A 236 of chipset A 216 and the firmware C 240 of chipset C 220. In other cases, it may be that the firmware update binary 224 is operable to change or replace the firmware of all chipsets of the docking station 204 (e.g., change or replace the firmware A 236 of the chipset A 216, the firmware B 238 of the chipset B 218, the firmware C 240 of the chipset C 220, and the firmware D 242 of the chipset D 222).

As illustrated, the MCU 214 may communicate with the chipsets 216 through 222 via one or more of a USB interface, a serial interface, a UART interface, or a GPIO interface. In some embodiments, different interfaces could be used for different chipsets (e.g., the MCU 214 could communicate with the chipset A 216 via a serial interface, while the MCU 214 communicates with the chipset D 222 via a GPIO interface). According to the operability of the firmware update binary 224, the firmware update is performed for a respective chipset via the interface between the chipset and the MCU 214.

The firmware update process for the one or more chipsets 216 through 222 can be performed without any input from any host device of the docking station 204. For example, the USB mini host controller 212 may operate the USB hosting engine 230 to access the firmware update binary 224 on the USB storage device 202 and eventually communicate the firmware update binary 224 to the MCU 214 independently of any host device useable with the docking station 204. Further, the MCU 214 may then perform a corresponding firmware update for any of the chipsets 216 through 222 independently of any host device useable with the docking station 204. In other words, the firmware update process described in relation to the system 200 can happen independently of whether or not any host device is connected to the docking station 204 at the time of the firmware update.

Further, it is anticipated that the firmware update process described above could be performed while the docking station 204 (also) continues to perform the functions of the docking station 204 for an attached host device (in the case that one is attached to the docking station 204 at the time of the firmware update). For example, the USB storage device 202 could be inserted into the docking station 204, and the MCU 214 may receive the firmware update binary 224 from the USB storage device 202 and use it to perform a corresponding firmware update, while the docking station 204 continues to, for example, transport data between the host device and the docking station 204 and/or transport power from the docking station 204 to the host device.

It is contemplated that in alternative embodiments to FIG. 2, an MCU of the docking station 204 having the functions of the MCU 214 may itself (also) include a USB mini host controller and/or a USB hub controller. In such cases, the USB interface illustrated in FIG. 2 between the USB hub controller 210 and the USB mini host controller 212 may not be used, and/or the one or more of the USB, serial, UART, and/or GPIO interface(s) illustrated between the USB mini host controller 212 and the MCU 214 in FIG. 2 may not be used. Further, in cases where the functions of a USB hub controller and a USB mini host controller are incorporated into such an MCU, a USB port to which a USB storage device is connected may correspond to a USB interface proceeding directly to that MCU (with the supporting operations of the USB hosting engine in such cases being performed directly by that MCU).

Figure 3:
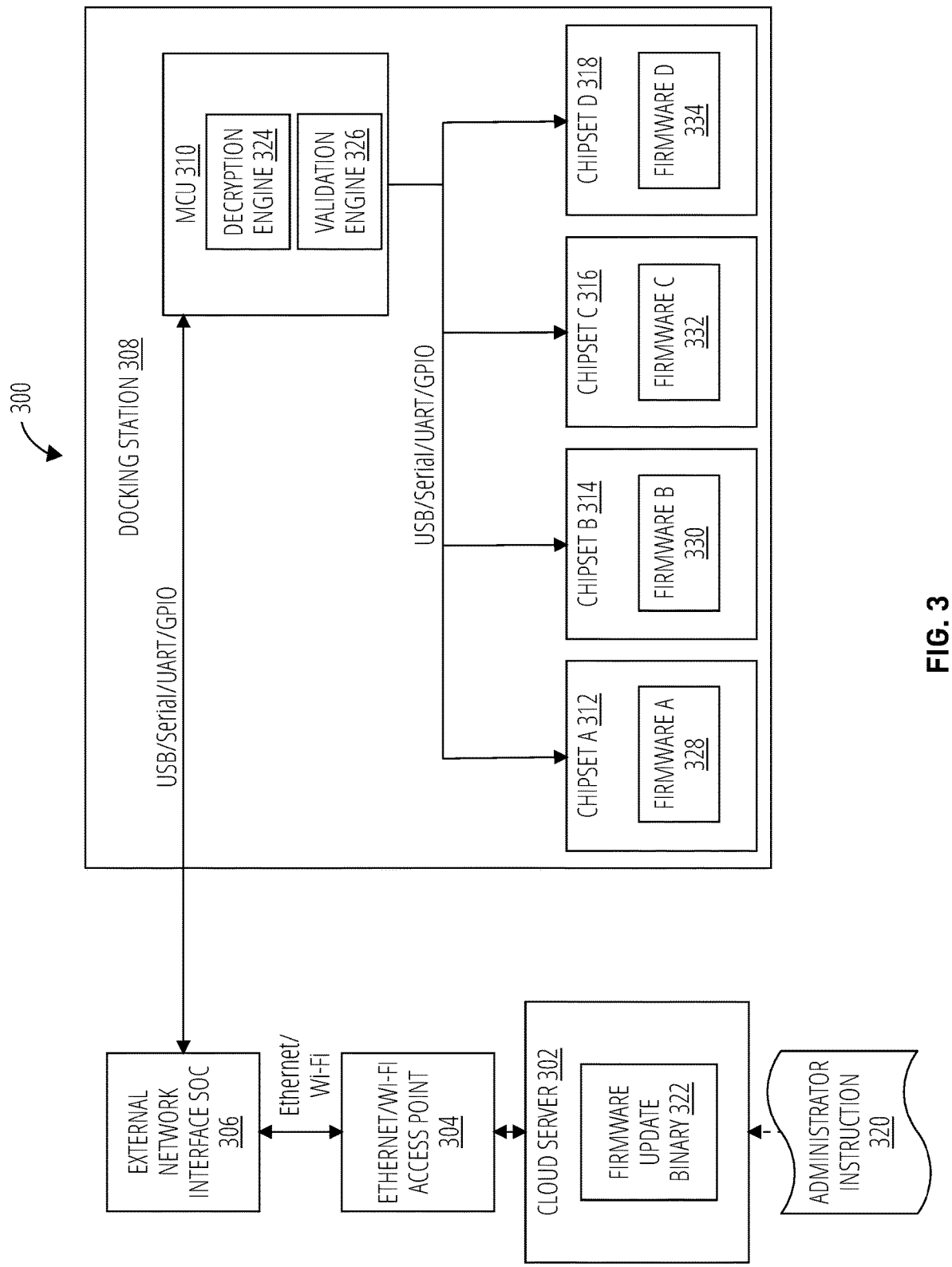
FIG. 3 illustrates a system including a cloud server, an Ethernet/Wi-Fi access point, an external network interface system on a chip (SoC), and a docking station, according to an embodiment.

FIG. 3 illustrates a system 300 including a cloud server 302, an Ethernet/Wi-Fi access point 304, an external network interface SoC 306, and a docking station 308, according to an embodiment. As illustrated, the cloud server 302 may include a firmware update binary 322. The docking station 308 may include an MCU 310 having a decryption engine 324 and a validation engine 326 and a number of chipsets, each operating according to its respective firmware. In the example of FIG. 3, the system 300 comprises a chipset A 312 having firmware A 328, a chipset B 314 having firmware B 330, a chipset C 316 having firmware C 332, and a chipset D 318 having firmware D 334.

As illustrated, an administrator instruction 320 may arrive at the cloud server 302. Alternatively, the administrator instruction 320 may originate at the cloud server 302. The administrator instruction 320 may instruct the cloud server 302 to perform a firmware update for one or more of the chipsets 312 to 318 of the docking station 308.

The cloud server 302 may be, for example, a system operated by an administrator of the system 300 and that can be reached via a network (e.g., the Internet). The cloud server 302 may contain chipset firmware update data useable to perform a firmware update for one or more of the chipsets of the docking station 308. For example, the cloud server 302 may contain a firmware update binary 322 that can be used by the docking station 308 to update the firmware of one or more of the chipsets 312 through 318.

The administrator instruction 320 may arrive/occur at the cloud server 302 according to a configuration of the cloud server 302 (e.g., as configured by an administrator of the system 300). For example, the administrator instruction 320 may arrive/occur whenever it is determined by the cloud server 302 that new firmware for one or more of the chipsets 312 through 318 of the docking station 308 is available, and/or at a predetermined update cadence. Alternatively, the administrator instruction 320 may be manually triggered (e.g., via manual interaction with a user of the cloud server 302).

In response to the administrator instruction 320, the cloud server 302 may send the firmware update binary 322 to the Ethernet/Wi-Fi access point 304 (e.g., via the Internet). The Ethernet/Wi-Fi access point 304 may be an access point that is local to the docking station 308. For example, it may be an access point that is within a Wi-Fi communication range with the general location of the docking station 308, or an access point physically situated relatively near to the docking station 308 such that a physical connection (e.g., an Ethernet cable) can feasibly be run between the Ethernet/Wi-Fi access point 304 and the general location of the docking station 308.

As illustrated, the docking station 308 may be connected to an external network interface SoC 306. The external network interface SoC 306 may communicate with the MCU 310 of the docking station 308 via one or more of a USB interface (e.g., via USB ports of the external network interface SoC 306 and the docking station 308), a serial interface (e.g., via serial ports of the external network interface SoC 306 and the docking station 308), a UART interface (e.g., via an RS232 (DB9) connector on each of the external network interface SoC 306 and the docking station 308), and/or a GPIO interface (e.g., via GPIO pins of the external network interface SoC 306 and the docking station 308), each of which may be an example of a physical communication interface used by the docking station 308. The external network interface SoC 306 may also include any connectors, circuitry, and firmware for receiving network communications (e.g., a "network interface") from an access point external to the docking station 308 (such as the Ethernet/Wi-Fi access point 304). For example, the external network interface SoC 306 may include one or more antenna(s) and related circuitry and firmware for a Wi-Fi interface between the external network interface SoC 306 and the Ethernet/Wi-Fi access point 304. Additionally or alternatively, the external network interface SoC 306 may include an RJ-45 port and related circuitry and firmware for an Ethernet interface (facilitated by an Ethernet cable) between the external network interface SoC 306 and the Ethernet/Wi-Fi access point 304.

The external network interface SoC 306 may have been connected to the docking station 308 for purposes of facilitating a firmware update of one or more of the chipsets 312 to 318 and may therefore be in proximity to the docking station 308 (and thus within the described range of the Ethernet/Wi-Fi access point 304). Accordingly, the Ethernet/Wi-Fi access point 304 may provide the firmware update binary 322 to the external network interface SoC 306 via one or more of the Ethernet and/or Wi-Fi interface. The external network interface SoC 306 may then use one or more of the in-use USB, serial, UART, and/or GPIO interface(s) between the external network interface SoC 306 and the MCU 310 of the docking station 308 to provide the MCU 310 with the firmware update binary 322.

Upon receipt of the firmware update binary 322, the MCU 310 may determine whether the firmware update binary 322 is encrypted. If so, the decryption engine 324 of the MCU 310 is used to decrypt the firmware update binary 322 as received. In some embodiments, if the firmware update binary 322 cannot be decrypted, the firmware update binary 322 is not further used and is discarded. This decryption may be performed without any input from any host device attached to the docking station 308 (which may or may not be present)

Further, the MCU 310 may determine whether the firmware update binary 322 is signed. If so, the validation engine 326 of the MCU 310 may be used to validate the signature of the firmware update binary 322 as received, thereby ensuring that the firmware update binary 322 is valid. In some embodiments, if the firmware update binary 322 is not signed, or if the signature is determined to be invalid, the firmware update binary 322 is not further used and is instead discarded. This validation may be performed without any input from any host device attached to the docking station 308 (which may or may not be present).

Once the firmware update binary 322 is decrypted and/or validated, the MCU 310 may proceed to perform a firmware update for one or more of the chipset A 312, the chipset B 314, the chipset C 316, and/or the chipset D 318 using the firmware update binary 322. This process may change or replace the firmware of the respective chipset. For example, it may be that the firmware update binary 322 is operable to change or replace the firmware A 328 of chipset A 312. In other cases, it may be that the firmware update binary 322 is operable to change or replace each of the firmware A 328 of chipset A 312 and the firmware C 332 of chipset C 316. In other cases, it may be that the firmware update binary 322 is operable to change or replace the firmware of all chipsets of the docking station 308 (e.g., change or replace the firmware A 328 of the chipset A 312, the firmware B 330 of the chipset B 314, the firmware C 332 of the chipset C 316, and the firmware D 334 of the chipset D 318).

As illustrated, the MCU 310 may communicate with the chipsets 312 through 318 via one or more of a USB interface, a serial interface, a UART interface, or a GPIO interface. In some embodiments, different interfaces could be used for different chipsets (e.g., the MCU 310 could communicate with the chipset A 312 via a serial interface, while the MCU 310 communicates with the chipset D 318 via a GPIO interface). According to the operability of the firmware update binary 322, the firmware update is performed for a respective chipset via the interface between the chipset and the MCU 310.

The firmware update process for the one or more chipsets 312 through 318 can be performed without any input from any host device of the docking station 308. For example, the external network interface SoC 306 may receive the firmware update binary 322 from the Ethernet/Wi-Fi access point 304 and communicate the firmware update binary 322 to the MCU 310 independently of any host device useable with the docking station 308. Further, the MCU 310 may then perform a corresponding firmware update for any of the chipsets 312 through 318 independently of any host device useable with the docking station 308. In other words, the firmware update process described in relation to the system 300 can happen independently of whether or not any host device is connected to the docking station 308 at the time of the firmware update.

Further, it is anticipated that the firmware update process described above could be performed while the docking station 308 (also) continues to perform the functions of the docking station 308 for an attached host device (in the case that one is attached to the docking station 308 at the time of the firmware update). For example, the external network interface SoC 306 could be connected to the docking station 308 and receive the firmware update binary 322 from the Ethernet/Wi-Fi access point 304, and the MCU 310 may receive the firmware update binary 322 from the external network interface SoC 306 and use it to perform a corresponding firmware update, while the docking station 308 continues to, for example, transport data between the host device and the docking station 308 and/or transport power from the docking station 308 to the host device.

Figure 4:
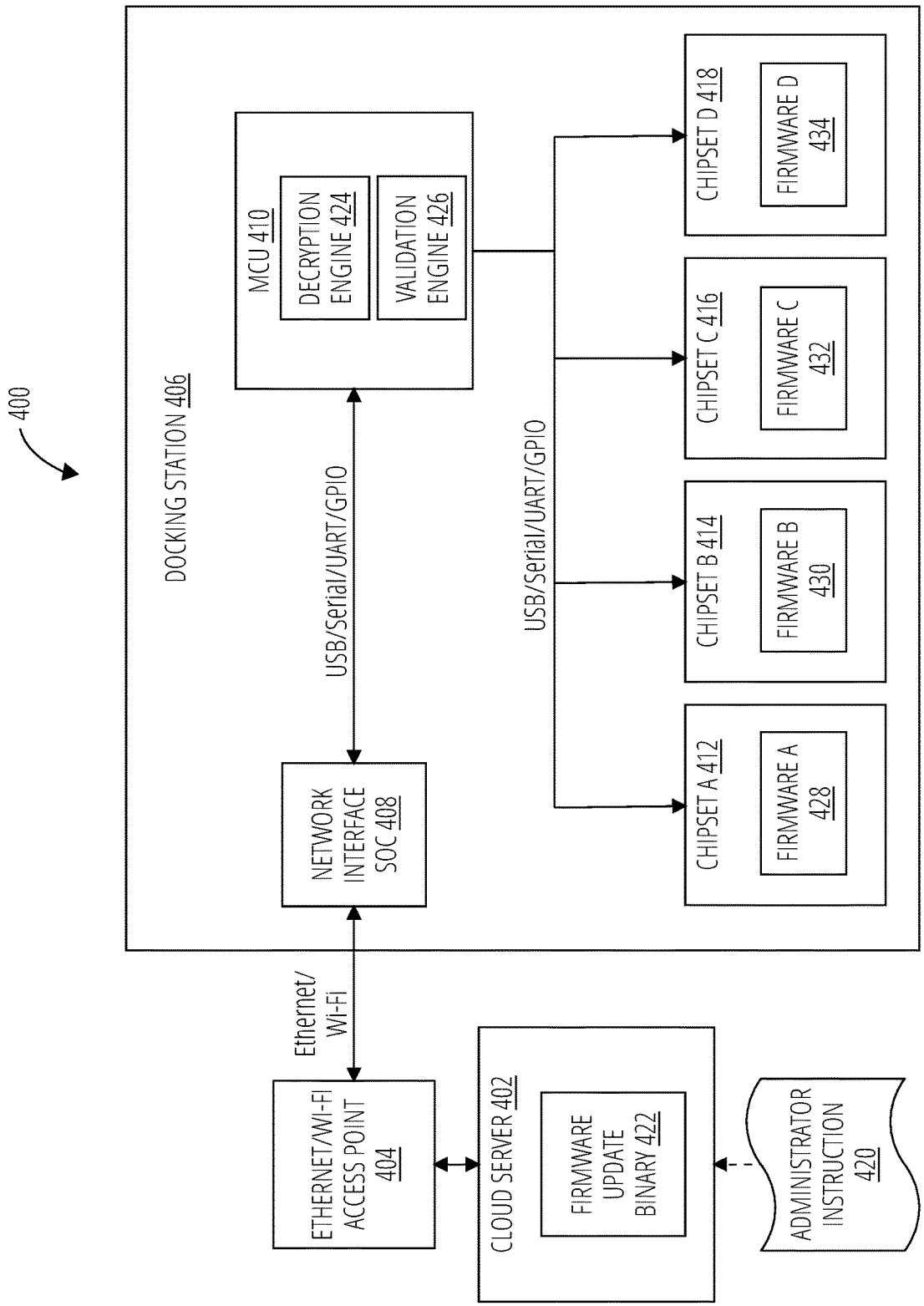
FIG. 4 illustrates a system including a cloud server, an Ethernet/Wi-Fi access point, and a docking station, according to an embodiment.
Figure 5:
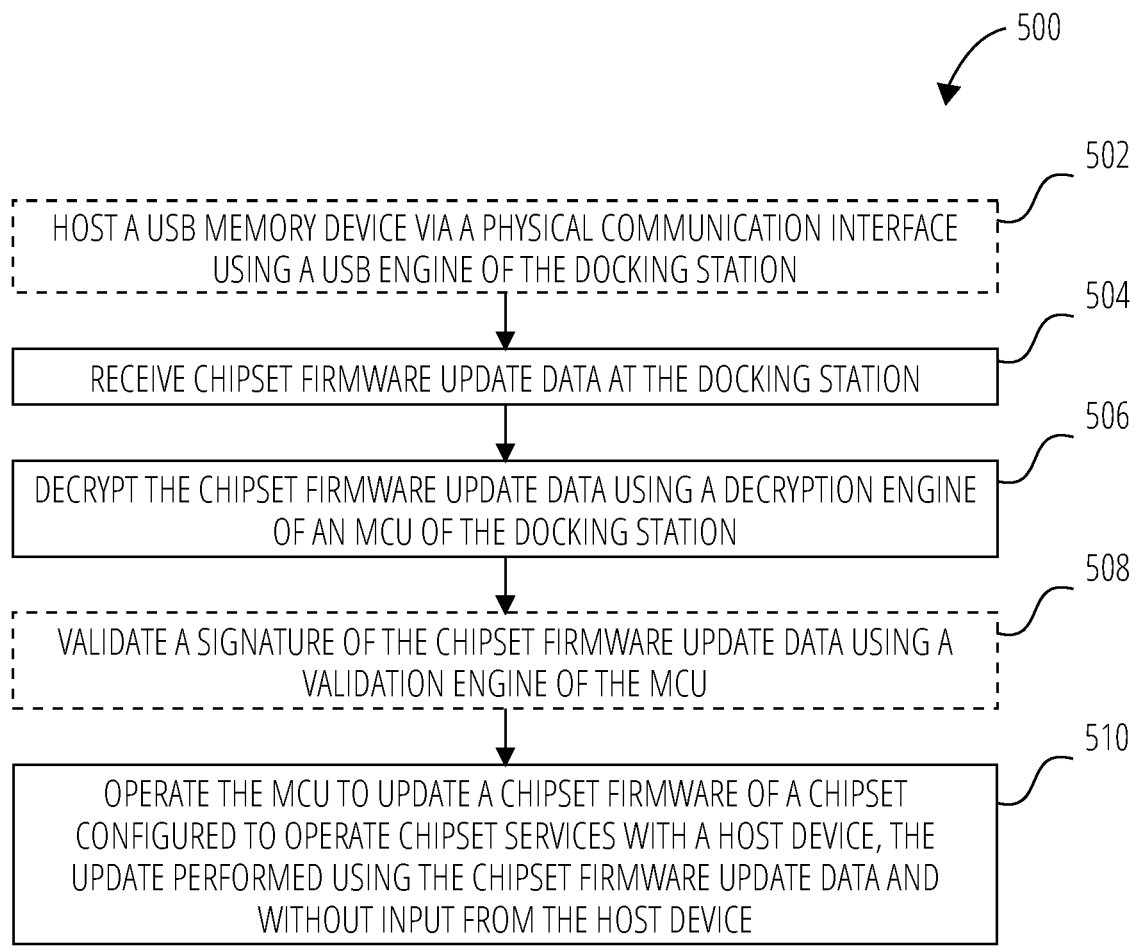
FIG. 5 illustrates a method of performing a docking station chipset firmware update, according to an embodiment.

FIG. 4 illustrates a system 400 including a cloud server 402, an Ethernet/Wi-Fi access point 404, and a docking station 406, according to an embodiment. As illustrated, the cloud server 402 may include a firmware update binary 422. The docking station 406 may include a network interface SoC 408, an MCU 410 having a decryption engine 424 and a validation engine 426, and a number of chip sets, each operating according to its respective firmware. In the example of FIG. 4, the docking station 406 comprises a chipset A 412 having firmware A 428, a chipset B 414 having firmware B 430, a chipset C 416 having firmware C 432, and a chipset D 418 having firmware D 434.

As illustrated, an administrator instruction 420 may arrive at the cloud server 402. Alternatively, the administrator instruction 420 may originate at the cloud server 402. The administrator instruction 420 may instruct the cloud server 402 to perform a firmware update for one or more of the chipsets 412 to 418 of the docking station 406.

The cloud server 402 may be, for example, a system operated by an administrator of the system 400 and that can be reached via a network (e.g., the Internet). The cloud server 402 may contain chipset firmware update data useable to perform a firmware update for one or more of the chipsets of the docking station 406. For example, the cloud server 402 may contain a firmware update binary 422 that can be used by the docking station 406 to update the firmware of one or more of the chipsets 412 through 418.

The administrator instruction 420 may arrive/occur at the cloud server 402 according to a configuration of the cloud server 402 (e.g., as configured by an administrator of the system 400). For example, the administrator instruction 420 may arrive/occur whenever it is determined by the cloud server 402 that new firmware for one or more of the chipsets 412 through 418 of the docking station 406 is available, and/or at a predetermined update cadence. Alternatively, the administrator instruction 420 may be manually triggered (e.g., via manual interaction with a user of the cloud server 402).

In response to the administrator instruction 420, the cloud server 402 may send the firmware update binary 422 to the Ethernet/Wi-Fi access point 404 (e.g., via the Internet). The Ethernet/Wi-Fi access point 404 may be an access point that is local to the docking station 406. For example, it may be an access point that is within a Wi-Fi communication range with the general location of the docking station 406, or an access point physically situated relatively near to the docking station 406 such that a physical connection (e.g., an Ethernet cable) can feasibly be run between the Ethernet/Wi-Fi access point 404 and the general location of the docking station 406.

As illustrated, the docking station 406 may include a network interface SoC 408. The network interface SoC 408 may communicate with the MCU 410 of the docking station 406 via one or more of a USB interface, a serial interface, a UART interface, and/or a GPIO interface. The network interface SoC 408 may also include any connectors, circuitry, and firmware for receiving network communications (e.g., a "network interface") from an access point external to the docking station 308 (such as the Ethernet/Wi-Fi access point 404). For example, the network interface SoC 408 may include one or more antenna(s) and related circuitry and firmware for a Wi-Fi interface between the network interface SoC 408 and the Ethernet/Wi-Fi access point 404. Such a Wi-Fi interface may be an example of a network interface of the docking station 406. Additionally or alternatively, the network interface SoC 408 may include an RJ-45 port (that is physically exposed through the docking station 406) and related circuitry and firmware for an Ethernet interface (facilitated by an Ethernet cable) between the network interface SoC 408 and the Ethernet/Wi-Fi access point 404. Such an Ethernet interface may be an example of each of a physical communication interface and a network interface of the docking station 406.

The Ethernet/Wi-Fi access point 404 may provide the firmware update binary 422 to the network interface SoC 408 via one or more of the Ethernet and/or Wi-Fi interface.

The network interface SoC 408 may then use one or more of the in-use USB, serial, UART, and/or GPIO interface(s) between the network interface SoC 408 and the MCU 410 of the docking station 406 to provide the MCU 410 with the firmware update binary 422.

Upon receipt of the firmware update binary 422, the MCU 410 may determine whether the firmware update binary 422 is encrypted. If so, the decryption engine 424 of the MCU 410 is used to decrypt the firmware update binary 422 as received. In some embodiments, if the firmware update binary 422 cannot be decrypted, the firmware update binary 422 is not further used and is discarded. This decryption may be performed without any input from any host device attached to the docking station 406 (which may or may not be present)

Further, the MCU 410 may determine whether the firmware update binary 422 is signed. If so, the validation engine 426 of the MCU 410 may be used to validate the signature of the firmware update binary 422 as received, thereby ensuring that the firmware update binary 422 is valid. In some embodiments, if the firmware update binary 422 is not signed, or if the signature is determined to be invalid, the firmware update binary 422 is not further used and is instead discarded. This validation may be performed without any input from any host device attached to the docking station 406 (which may or may not be present).

Once the firmware update binary 422 is decrypted and/or validated, the MCU 410 may proceed to perform a firmware update for one or more of the chipset A 412, the chipset B 414, the chipset C 416, and/or chipset D 418 using the firmware update binary 422. This process may change or replace the firmware of the respective chipset. For example, it may be that the firmware update binary 422 is operable to change or replace the firmware A 428 of chipset A 412. In other cases, it may be that the firmware update binary 422 is operable to change or replace each of the firmware A 428 of chipset A 412 and the firmware C 432 of chipset C 416. In other cases, it may be that the firmware update binary 422 is operable to change or replace the firmware of all chipsets of the docking station 406 (e.g., change or replace the firmware A 428 of the chipset A 412, the firmware B 430 of the chipset B 414, the firmware C 432 of the chipset C 416, and the firmware D 434 of the chipset D 418).

As illustrated, the MCU 410 may communicate with the chipsets 412 through 418 via one or more of a USB interface, a serial interface, a UART interface, or a GPIO interface. In some embodiments, different interfaces could be used for different chipsets (e.g., the MCU 410 could communicate with the chipset A 412 via a serial interface, while the MCU 410 communicates with the chipset D 418 via a GPIO interface). According to the operability of the firmware update binary 422, a firmware update is performed for a respective chipset via the interface between the chipset and the MCU 410.

The firmware update process for the one or more chipsets 412 through 418 can be performed without any input from any host device of the docking station 406. For example, the network interface SoC 408 may receive the firmware update binary 422 from the Ethernet/Wi-Fi access point 404 and communicate the firmware update binary 422 to the MCU 410 independently of any host device useable with the docking station 406. Further, the MCU 410 may then perform a corresponding firmware update for any of the chipsets 412 through 418 independently of any host device useable with the docking station 406. In other words, the firmware update process described in relation to the system 400 can happen independently of whether or not any host device is connected to the docking station 406 at the time of the firmware update.

Further, it is anticipated that the firmware update process described above could be performed while the docking station 406 (also) continues to perform the functions of the docking station 406 for an attached host device (in the case that one is attached to the docking station 406 at the time of the firmware update). For example, the network interface SoC 408 could receive the firmware update binary 422 from the Ethernet/Wi-Fi access point 404, and the MCU 310 may in turn receive the firmware update binary 422 from the network interface SoC 408 and use it to perform a corresponding firmware update, while the docking station 406 continues to, for example, transport data between the host device and the docking station 406 and/or transport power from the docking station 406 to the host device.

FIG. $5_{[A1]}$ illustrates a method 500 of performing a docking station chipset firmware update, according to an embodiment. The method 500 optionally includes hosting 502 a USB memory device via a physical communication interface using a USB engine of the docking station.

The method 500 further includes receiving 504 chipset firmware update data at the docking station. In some embodiments, the chipset firmware update data is received in encrypted form. Further, in some embodiments, the chipset firmware data is received in signed form (e.g., received along with a signature to use for validating the chipset firmware update data).

The method 500 further includes decrypting 506 the chipset firmware update data using a decryption engine of an MCU of the docking station.

The method 500 further optionally includes validating 508 the signature of the chipset firmware update data using a validation engine of the MCU.

The method 500 further includes operating 510 the MCU to update a chipset firmware of a chipset configured to operate chipset services with a host device, the update performed using the chipset firmware update data and without input from the host device.

In some embodiments of the method 500, the chipset firmware update data is received at the docking station via a physical communication interface of the docking station. In some of these embodiments that include the hosting 502, the chipset firmware update data is received at the docking station from the USB memory device via the physical communication interface being operated to host the USB memory device.

In some embodiments of the method 500, the chipset firmware update data is received at the docking station via a network interface of the docking station.

In some embodiments of the method 500, the chipset firmware update data is received at the docking station without input from the host device.

In some embodiments of the method 500, the chipset firmware update data is decrypted using the decryption engine of the MCU without input from the host device.

In some embodiments of the method 500 that include the validating 508, the signature of the chipset firmware update data is validated using the validation engine of the MCU without input from the host device.

In some embodiments of the method 500, the host device is not connected to the docking station.

Figure 6:
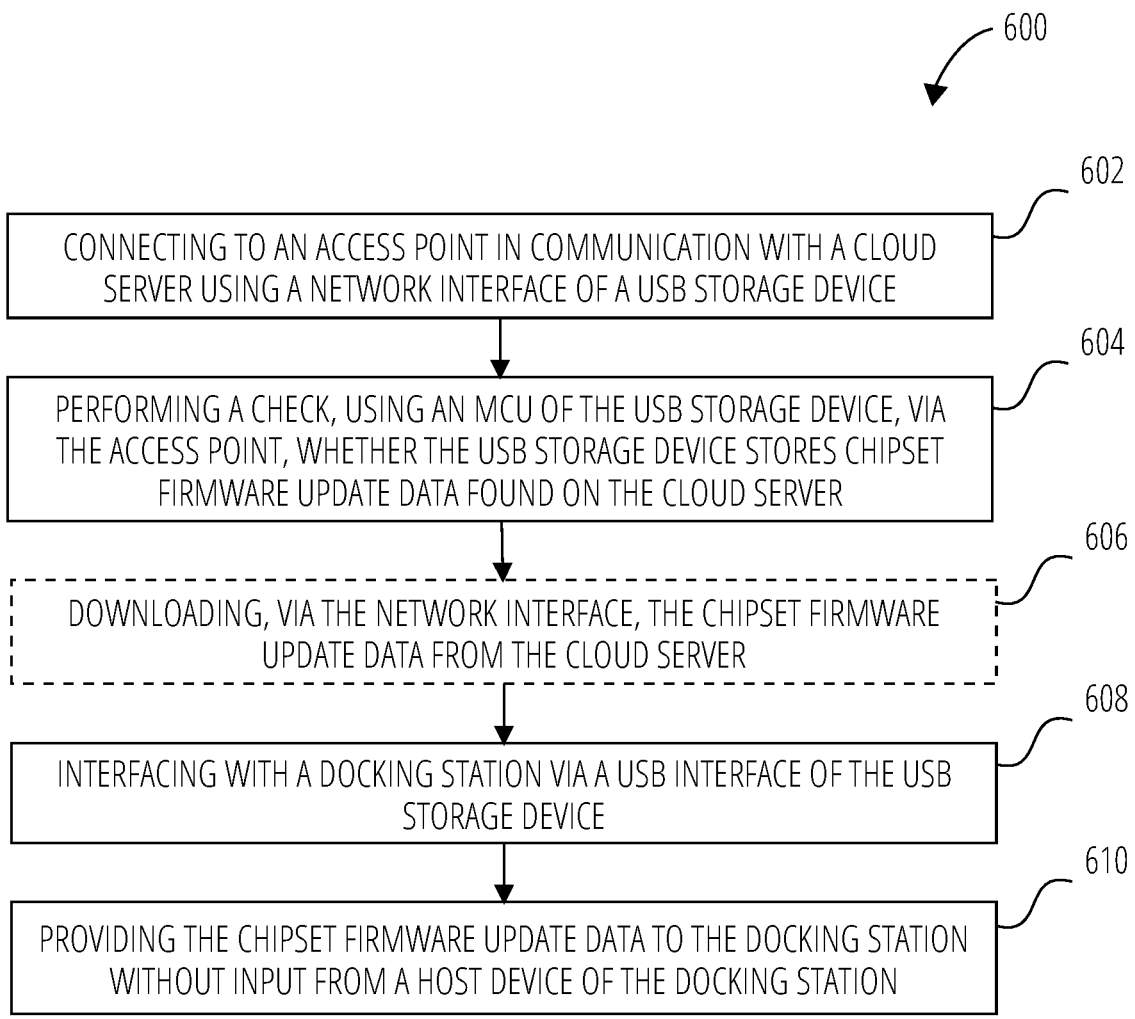
FIG. 6 illustrates a method of a USB storage device, according to an embodiment.

FIG. 6 illustrates a method 600 of a USB storage device, according to an embodiment. The method 600 includes connecting 602 to an access point in communication with a cloud server using a network interface of the USB storage device.

The method 600 further includes performing 604 a check, using an MCU of the USB storage device, via the access point, whether the USB storage device stores chipset firmware update data found on the cloud server.

The method 600 further optionally includes downloading 606, via the network interface, the chipset firmware update data from the cloud server. The downloading 606 may be performed responsive to a determination made by the MCU during the check that the USB storage device does not include the chipset firmware update data found on the cloud server.

The method 600 further includes interfacing 608 with a docking station via a USB interface of the USB storage device.

The method 600 further includes providing 610 the chipset firmware update data to the docking station without input from a host device of the docking station.

In some embodiments of the method 600, the chipset firmware update data is in an encrypted form.

In some embodiments of the method 600, the chipset firmware update data is in a signed form.

In some embodiments of the method 600, the network interface comprises a Wi-Fi interface.

In some embodiments of the method 600, the MCU performs the check on a periodic basis.

In some embodiments of the method 600, the MCU performs the check upon a connection of the USB storage device to the access point via the network interface.

In some embodiments of the method 600, the MCU performs the check upon a connection of the USB storage device to the docking station and prior to the USB storage device providing the firmware update data to the docking station.

The devices disclosed herein may respectively include one or more MCUs, SoCs, controllers, processors, etc. using instructions present thereon to implement one or more functionalities of each such device as those functionalities are described herein. The instructions used by such MCUs, SoCs, controllers, processors, etc. may be stored on a memory (e.g., a non-transitory computer readable storage medium) on, or in communication with, such MCUs, SoCs, controllers, processors, etc. It is anticipated that these MCUs, SoCs, controllers, processors, etc. (and/or any associated non-transitory computer-readable instructions for use thereon) may be present in any embodiment disclosed herein (even if not explicitly discussed).

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

The invention claimed is:

1. A docking station, comprising:
a universal serial bus (USB) port for connecting to a USB memory device comprising chipset firmware update data usable to perform a firmware update for one or more chipsets of the docking station;
a microcontroller unit (MCU) including a validation engine;
a USB host controller comprising a USB hosting engine;
a chipset of the one or more chipsets configured to operate chipset services with a host device communicatively coupled to the docking station, according to chipset firmware;
wherein the docking station is configured to:
host the USB memory device via the USB host controller using the USB hosting engine;
receive, from the USB memory device, the chipset firmware update data including a signature;
determine that the chipset firmware update data, including a firmware update binary, is signed;
determine that the chipset firmware update data is valid based on validating the received signature of the chipset firmware update data without input from the host device; and
based on the validation, operate the MCU to update the chipset firmware using the chipset firmware update data without input from the host device.

2. The docking station of claim 1, wherein the chipset firmware update data from the USB memory device is received without input from the host device.

3. The docking station of claim 1, wherein:
the chipset firmware update data is received from the USB memory device in encrypted form;
the MCU further comprises a decryption engine; and
the MCU is further configured to decrypt the chipset firmware update data.

4. The docking station of claim 3, wherein the MCU is further configured to decrypt the chipset firmware update data without input from the host device.

5. The docking station of claim 1, wherein:
the MCU further comprises the validation engine; and
the MCU is further configured to validate the signature of the chipset firmware update data.

6. A docking station, comprising:
a microcontroller unit (MCU) comprising a decryption engine and a validation engine; and
a chipset of one or more chipsets of the docking station, the chipset configured to operate chipset services with a host device, communicatively coupled to the docking station, according to chipset firmware;
wherein the docking station is configured to:
receive, from a universal serial bus (USB) memory device, chipset firmware update data including a signature wherein the chipset firmware update is usable to perform a firmware update for one or more chipsets of the docking station;
operate the MCU to decrypt the chipset firmware update data using the decryption engine;
determine that the chipset firmware update data, including a firmware update binary, is signed using the received signature;

determine that the chipset firmware update data is valid based on validating the received signature of the chipset firmware update data without input from the host device; and based on the validation, operate the MCU to update the chipset firmware using the chipset firmware update data without input from the host device.

7. The docking station of claim 6, wherein the docking station receives the chipset firmware update data without input from the host device.

8. The docking station of claim 6, wherein the docking station operates the MCU to decrypt the chipset firmware update data without input from the host device.

9. The docking station of claim 6, further comprising:
a network interface, wherein the chipset firmware update data is received at the docking station via the network interface.

10. The docking station of claim 6, further comprising:
a physical communication interface, wherein the chipset firmware update data is received at the docking station via the physical communication interface.

11. The docking station of claim 6, wherein:
the MCU further comprises the validation engine; and
the docking station is further configured to operate the MCU to validate the signature of the chipset firmware update data using the validation engine.

12. A method of a docking station, comprising:
receiving chipset firmware update data at the docking station from a universal serial bus (USB) memory device, wherein the chipset firmware update data is received in encrypted form, and includes a firmware update binary and a signature, and wherein the firmware update data is usable to perform a firmware update for one or more chipsets of the docking station;
decrypting the chipset firmware update data using a decryption engine of a microcontroller unit (MCU) of the docking station;
determining that the chipset firmware update data, including the firmware update binary, is signed using the received signature;
determine that the chipset firmware update data is valid based on validating the received signature of the chipset firmware update data without input from a host device communicatively coupled to the docking station; and
based on the validation, operating the MCU to update a chipset firmware of a chipset configured to operate chipset services with the host device, the update performed using the chipset firmware update data and without input from the host device.

13. The method of claim 12, further comprising validating the signature of the chipset firmware update data using a validation engine of the MCU.

14. The method of claim 12, wherein the chipset firmware update data is received at the docking station via a physical communication interface of the docking station.

15. The method of claim 14, further comprising hosting the USB memory device via the physical communication interface using a USB hosting engine of the docking station.

16. The method of claim 12, wherein the chipset firmware update data is received at the docking station via a network interface of the docking station.

17. The method of claim 12, wherein the chipset firmware update data is received at the docking station without input from the host device.

18. The method of claim 12, wherein the chipset firmware update data is decrypted using the decryption engine of the MCU without input from the host device.

19. A universal serial bus (USB) storage device, comprising:
a network interface configured to communicate with a cloud server via an access point;
a microcontroller unit (MCU) to perform a check of whether the USB storage device stores chipset firmware update data, including a firmware update binary and including a signature, found on the cloud server;
a USB interface to connect the USB storage device to a docking station, wherein the USB storage device provides the chipset firmware update data, including the firmware update binary and the signature, to the docking station via the USB interface without input from a host device communicatively coupled to the docking station,
wherein the chipset firmware update data is usable to perform a firmware update for one or more chipsets of the docking station; and
wherein the MCU is further configured to:
determine that the chipset firmware update data, including a firmware update binary, is signed using the received signature;
determine that the chipset firmware update data is valid based on validating the received signature without input from the host device; and
update the chipset firmware using chipset firmware update data without input from the host device.

20. The USB storage device of claim 19, wherein the chipset firmware update data is in an encrypted form.

21. The USB storage device of claim 19, wherein the chipset firmware update data is in a signed form.

22. The USB storage device of claim 19, wherein the network interface comprises a Wi-Fi interface.

23. The USB storage device of claim 19, further comprising downloading, using the network interface, the chipset firmware update data from the cloud server responsive to a determination made by the MCU during the check that the USB storage device does not include the chipset firmware update data found on the cloud server.

24. The USB storage device of claim 19, wherein the MCU performs the check on a periodic basis.

25. The USB storage device of claim 19, wherein the MCU performs the check upon a connection of the USB storage device to the access point via the network interface.

26. The USB storage device of claim 19, wherein the MCU performs the check upon a connection of the USB storage device to the docking station and prior to the USB storage device providing the chipset firmware update data to the docking station.

\* \* \* \* \*